US012703134B2

(12) United States Patent
Suzuki et al.

(10) Patent No.: US 12,703,134 B2
(45) Date of Patent: Aug. 11, 2026

(54) MANUFACTURING APPARATUS AND MANUFACTURING METHOD OF MOLDED PRODUCTS

(71) Applicant: CANON KABUSHIKI KAISHA, Tokyo (JP)

(72) Inventors: Akira Suzuki, Kanagawa (JP); Toshiki Kobayashi, Kanagawa (JP); Junichi Matsumura, Shizuoka (JP); Kengo Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 18/184,059

(22) Filed: Mar. 15, 2023

(65) Prior Publication Data

US 2023/0302698 A1 Sep. 28, 2023

(30) Foreign Application Priority Data

Mar. 23, 2022 (JP) ................................ 2022-046726
Feb. 21, 2023 (JP) ................................ 2023-024879

(51) Int. Cl.
*B29C 45/53* (2006.01)
*B29C 45/58* (2006.01)

(52) U.S. Cl.
CPC ............ *B29C 45/53* (2013.01); *B29C 45/586* (2013.01); *B29C 2945/76096* (2013.01); *B29C 2945/762* (2013.01)

(58) Field of Classification Search
CPC ....... B29C 45/53; B29C 45/54; B29C 45/586; B29C 2945/762; B29C 2945/76096
See application file for complete search history.

(56) References Cited

U.S. PATENT DOCUMENTS 5,119,866 A * 6/1992 Mihara .................. B29C 45/56 425/149
6,045,740 A 4/2000 Goerlich
(Continued)

FOREIGN PATENT DOCUMENTS

EP 3 173 207 B1 3/2019
JP 663135212 A 6/1988
(Continued)

OTHER PUBLICATIONS

Notice of Reasons for Refusal in Japanese Application No. 2023-024879 (Feb. 2024).

(Continued)

*Primary Examiner* — Jerzi H Moreno Hernandez
(74) *Attorney, Agent, or Firm* — Venable LLP

(57) ABSTRACT

A manufacturing apparatus includes an injection cylinder to which molten resin is supplied and which is configured to inject molten resin, an injection plunger disposed such that the injection plunger fits in the injection cylinder and moves in a first direction and a second direction opposite to the first direction, a pressing member configured to be able to be separated from the injection plunger and press the injection plunger for moving the injection plunger toward the first direction, and a sensor configured to detect contact and/or separation between the injection plunger and the pressing member. In a state where the pressing member is separated from the injection plunger, molten resin supplied into the injection cylinder presses the injection plunger to move the injection plunger in the second direction, and contact between the injection plunger and the pressing member is detected by the sensor.

20 Claims, 16 Drawing Sheets

(56) References Cited

U.S. PATENT DOCUMENTS

| | | | | |
|---|---|---|---|---|
| 6,390,798 | B1 * | 5/2002 | Fujikawa | B29C 45/58 425/547 |
| 2008/0111265 | A1 * | 5/2008 | Ujma | B29C 45/54 264/40.5 |
| 2013/0302468 | A1 * | 11/2013 | Ikeda | B29C 45/0416 425/574 |
| 2013/0309350 | A1 * | 11/2013 | Ikeda | B29C 45/062 425/589 |
| 2016/0200022 | A1 * | 7/2016 | Takei | B29C 45/77 264/328.1 |
| 2021/0268703 | A1 | 9/2021 | Aiba et al. | |
| 2023/0302697 | A1 | 9/2023 | Hoshi et al. | |

FOREIGN PATENT DOCUMENTS

| | | | |
|---|---|---|---|
| JP | 5-212763 | A | 8/1993 |
| JP | 5-269817 | A | 10/1993 |
| JP | 6-297521 | A | 10/1994 |
| JP | 6-304979 | A | 11/1994 |
| JP | 8-156012 | A | 6/1996 |
| JP | 9-201842 | A | 8/1997 |
| JP | 10-100210 | A | 4/1998 |
| JP | 10-235675 | A | 9/1998 |
| JP | 10-296780 | A | 11/1998 |
| JP | 11-77773 | A | 3/1999 |
| JP | 11-147239 | A | 6/1999 |
| JP | 2001-150503 | A | 6/2001 |
| JP | 2004-291356 | A | 10/2004 |
| JP | 2007-261055 | A | 10/2007 |
| JP | 2009-183966 | A | 8/2009 |
| JP | 2010-82950 | A | 4/2010 |
| JP | 2011140062 | A * | 7/2011 |
| JP | 2012-71336 | A | 4/2012 |
| JP | 2017-94618 | A | 6/2017 |
| JP | 2018-069286 | A | 5/2018 |
| JP | 2018-069287 | A | 5/2018 |
| WO | 2013/159210 | A1 | 10/2013 |

OTHER PUBLICATIONS

First Office Action in Chinese Application No. 202310266938.7 (Apr. 2026).

* cited by examiner

MANUFACTURING APPARATUS AND MANUFACTURING METHOD OF MOLDED PRODUCTS

BACKGROUND OF THE INVENTION

Field of the Invention

The present disclosure relates to manufacturing of molded products.

Description of the Related Art

In general, manufacturing apparatuses for manufacturing molded resin products through injection molding are known. In such a manufacturing apparatus, molten resin is injected into a cavity of a mold by using a screw, a plunger, or the like; then the molten resin is cooled and solidified in the mold; and then the mold is opened after the molten resin is solidified, for taking out a molded product. By repeating a series of operations from injecting the molten resin to taking out a molded product, molded products are mass-produced. For example, a pre-plunger injection molding machine and an in-line screw injection molding machine are known as the manufacturing apparatus that performs the injection molding.

Japanese Patent Application Publication No. 2007-261055 discloses a pre-plunger injection molding machine. The pre-plunger injection molding machine includes a plasticizing portion that includes a plasticizing screw, an injection cylinder that stores resin having been plasticized and melted, an injection plunger that injects the molten resin stored in the injection cylinder, and a driving mechanism that drives the injection plunger. The injection plunger is driven by the driving mechanism so as to move forward and backward.

However, the conventional injection molding machine causes the driving mechanism to force the injection plunger to move backward in a metering process or a suck-back process, for example. If the driving mechanism forces the injection plunger to move backward, the pressure may change rapidly in the molten resin contained in the injection cylinder, so that air may be sucked into the molten resin contained in the injection cylinder. If a molded product is manufactured in a state where the air is sucked into the molten resin, failure in molding, such as void or silver streak, may occur in the molded product.

SUMMARY OF THE INVENTION

According to a first aspect of the present invention, a manufacturing apparatus includes an injection cylinder to which molten resin is supplied and which is configured to inject the molten resin, and an injection plunger disposed such that the injection plunger fits in the injection cylinder and moves in a first direction and a second direction opposite to the first direction. The injection cylinder includes a base body configured to contain the molten resin, and a sleeve configured to be detachably attached to the base body. The injection plunger is configured to be inserted into an inner portion of the base body through an opening portion formed in the sleeve and slide on the sleeve.

According to a second aspect of the present invention, a manufacturing apparatus includes an injection cylinder to which molten resin is supplied and which is configured to inject the molten resin, an injection plunger disposed such that the injection plunger fits in the injection cylinder and moves in a first direction and a second direction opposite to the first direction, a pressing member configured to be able to be separated from the injection plunger and press the injection plunger for moving the injection plunger toward the first direction, and a sensor configured to detect contact and/or separation between the injection plunger and the pressing member.

According to a third aspect of the present invention, a manufacturing apparatus includes an injection cylinder to which molten resin is supplied and which is configured to inject the molten resin, an injection plunger disposed such that the injection plunger fits in the injection cylinder and moves in a first direction and a second direction opposite to the first direction, a pressing member configured to be able to be separated from the injection plunger and press the injection plunger for moving the injection plunger toward the first direction, a driving source configured to drive the pressing member in the first direction and the second direction, and a control portion configured to control the driving source. The injection plunger is moved toward the second direction by the molten resin supplied to the injection cylinder pressing the injection plunger in a state where the pressing member is separated from the injection plunger. The control portion is configured to control the driving source for moving the pressing member to a first position when metering the molten resin supplied to the injection cylinder, and control the driving source for injecting the molten resin after retracting the pressing member to a second position that is retracted from the first position.

According to a fourth aspect of the present invention, a manufacturing apparatus includes an injection cylinder to which molten resin is supplied and which is configured to inject the molten resin, an injection plunger disposed such that the injection plunger fits in the injection cylinder and moves in a first direction and a second direction opposite to the first direction, a driving source configured to drive the injection plunger, and a control portion configured to control the driving source. The control portion is configured to drive the driving source for moving the injection plunger toward the first direction when injecting the molten resin from the injection cylinder. The control portion is configured to stop the driving source for allowing the injection plunger to move toward the second direction when supplying the molten resin to the injection cylinder or when supply of the molten resin to the injection cylinder is completed.

Further features of the present invention will become apparent from the following description of exemplary embodiments with reference to the attached drawings.

DESCRIPTION OF THE EMBODIMENTS

Hereinafter, example embodiments of the present disclosure will be described in detail with reference to the accompanying drawings.

First Embodiment

Figure 1:
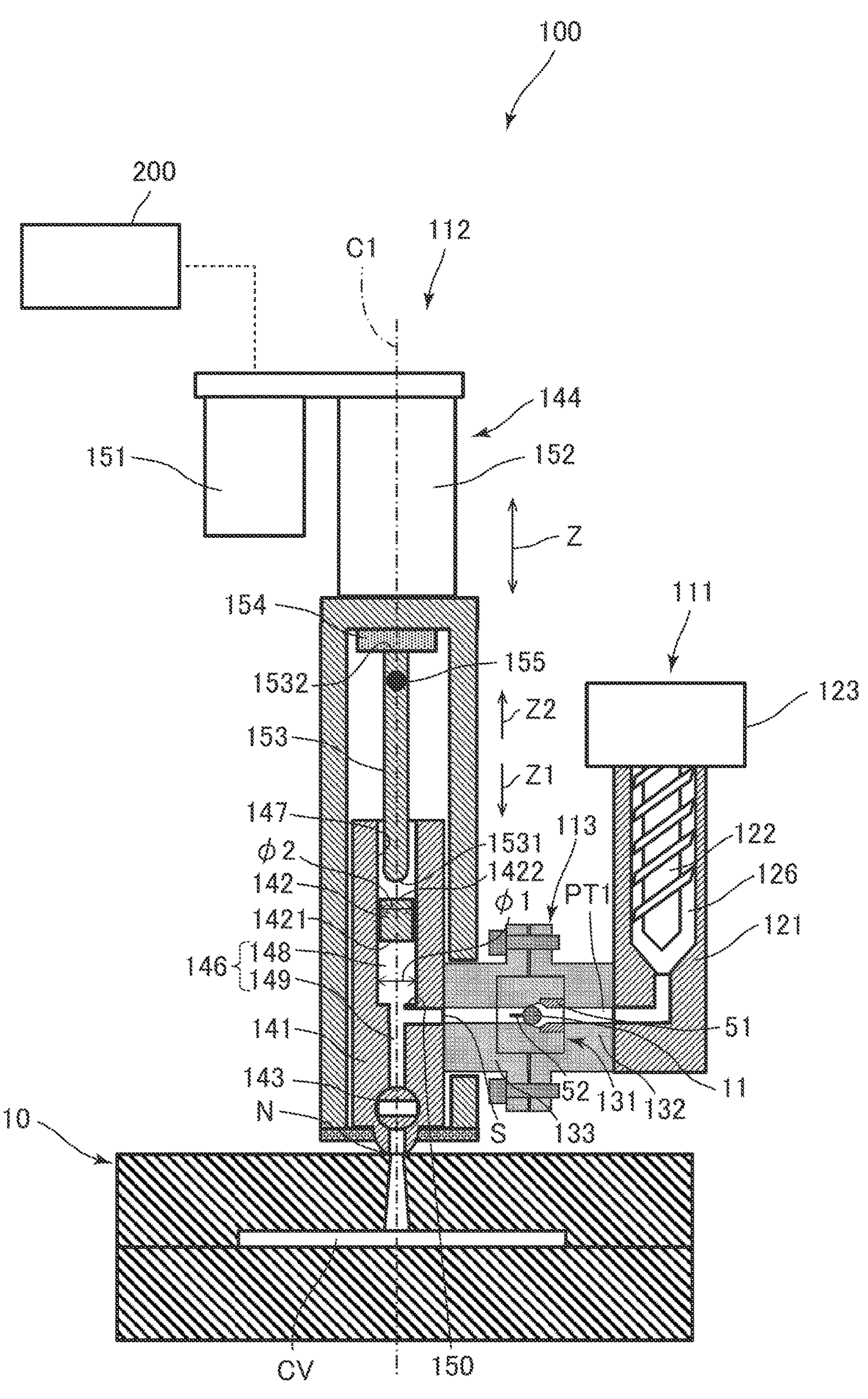
FIG. 1 is a schematic cross-sectional view of a manufacturing apparatus of a first embodiment.

FIG. 1 is a schematic cross-sectional view of a manufacturing apparatus 100 of a first embodiment. The manufacturing apparatus 100 is a pre-plunger injection molding apparatus, and is used for manufacturing molded products made of resin. The manufacturing apparatus 100 includes a plasticizing portion 111, an injection portion 112, a linking unit 113, and a control apparatus 200. The linking unit 113 is one example of a linking portion that links the plasticizing portion 111 and the injection portion 112. The control apparatus 200 is one example of a control portion. For example, the control apparatus 200 is one or more computers, each including a processor. The control apparatus 200 can control components included in the plasticizing portion 111 and the injection portion 112.

The plasticizing portion 111 plasticizes resin material that is put in the plasticizing portion 111, and supplies the resin material to the injection portion 112 through the linking unit 113. The injection portion 112 supplies the molten resin, supplied from the plasticizing portion 111, to an inner portion of a mold 10 by injecting the molten resin into the inner portion of the mold 10. Inside the mold 10, a cavity CV is defined by the mold 10 being closed. The cavity CV is a space portion whose shape corresponds to the shape of a corresponding molded product. The injection portion 112 fills the cavity CV with the molten resin via a runner, by injecting the molten resin into the cavity CV.

The plasticizing portion 111 includes a hopper (not illustrated), a plasticizing cylinder 121, a plasticizing screw 122, and a plasticizing driving portion 123. For example, pellet-shaped resin material is put in the hopper (not illustrated). The resin material is thermoplastic resin. The temperature of the plasticizing cylinder 121 is adjusted into a temperature at which the supplied resin material is plasticized, by the plasticizing cylinder 121 being heated by a heater (not illustrated). The plasticizing screw 122 is disposed in an inner portion 126 of the plasticizing cylinder 121. The plasticizing screw 122 is a screw that can rotate. For example, the diameter of the plasticizing screw 122 is 20 mm.

The plasticizing driving portion 123 includes a driving source, such as a motor; and rotates the plasticizing screw 122. The driving source of the plasticizing driving portion 123 is controlled by the control apparatus 200. When rotated by the plasticizing driving portion 123, the plasticizing screw 122 moves the resin material, supplied from the hopper (not illustrated), to the front end of the plasticizing screw 122, while plasticizing the resin material.

The injection portion 112 includes an injection cylinder 141, an injection plunger 142, a switching valve 143, and an injection driving portion 144. Preferably, the material of each of the injection cylinder 141 and the injection plunger 142 is a metal. Preferably, the metal is high-speed steel or cemented carbide, for example.

The injection cylinder 141 includes a supply inlet S through which the molten resin is supplied, and a nozzle N through which the molten resin is discharged. The nozzle N is one example of an injection outlet. In the first embodiment, the nozzle N is disposed at the front end of the injection cylinder 141 in a direction of an axis C1 of the injection cylinder 141. By bringing the nozzle N in contact with the mold 10, an inner portion 146 of the injection cylinder 141 and the cavity CV of the mold 10 are caused to communicate with each other.

The plasticizing cylinder 121 and the injection cylinder 141 are connected with each other via the linking unit 113. The linking unit 113 includes a check valve 131 connected to the supply inlet S. The check valve 131 is a valve that prevents the molten resin from flowing backward from the supply inlet S toward the outside of the injection cylinder 141 (that is, toward the plasticizing portion 111). That is, the check valve 131 is a valve that prevents the molten resin from flowing from the supply inlet S toward the outside of the injection cylinder 141. The inner portion 126 of the plasticizing cylinder 121 and the inner portion 146 of the injection cylinder 141 are connected with each other via a flow channel PT1, and the check valve 131 is disposed in the flow channel PT1. The linking unit 113 includes a member 132 and a member 133 that define the flow channel PT1. The check valve 131 is disposed inside the members 132 and 133. The check valve 131 includes a ball 11, a valve seat 51, and valve claws 52. The valve seat 51 is disposed on a side from which the resin flows, and the valve claws 52 are disposed on a side toward which the resin flows. For example, the diameter of the ball 11 is 8 mm.

The check valve 131 is connected to the supply inlet S, and is oriented so that the molten resin does not flow backward from the injection cylinder 141 to the plasticizing screw 122. Since the check valve 131 is disposed and connected to the supply inlet S, the molten resin flows in the flow channel PT1, in a forward direction from the plasticizing cylinder 121 toward the injection cylinder 141, but does not flow in a reverse direction from the injection cylinder 141 toward the plasticizing cylinder 121. The flow channel PT1 is a flow channel through which the molten resin flows. The resin having been melted and plasticized by the plasticizing screw 122 is supplied to the inner portion 146 of the injection cylinder 141 through the check valve 131 and the supply inlet S of the injection cylinder 141. In this manner, the molten resin supplied from the plasticizing screw 122 can be stored in the inner portion 146 of the injection cylinder 141. Note that an on-off valve may be disposed at the supply inlet S in place of the check valve 131.

In the inner portion 146 of the injection cylinder 141, the switching valve 143 is disposed in the vicinity of the nozzle N. The switching valve 143 can be switched between a position (open position) that allows the molten resin to be injected from the nozzle N, and a position (close position) that causes the molten resin to be blocked from being injected from the nozzle N. That is, the switching valve 143 is a valve that can prevent the molten resin from flowing from the nozzle (injection outlet) N toward the outside of the injection cylinder 141. The switching valve 143 is controlled by the control apparatus 200. The injection cylinder 141 includes an inner circumferential surface 147 that defines an internal space. The injection plunger 142 is disposed so as to fit in the injection cylinder 141 such that the injection plunger 142 can move with respect to the injection cylinder 141 in a Z direction that is a direction of the axis C1.

The injection driving portion 144 includes a motor 151, a transmission mechanism 152, and the pressing member 153. The motor 151 is one example of a driving source. Preferably, the material of the pressing member 153 is a metal. The motor 151 may be a rotary motor, and is controlled by the control apparatus 200. The transmission mechanism 152 is a mechanism that transmits the driving force of the motor 151 to the pressing member 153. For example, the transmission mechanism 152 includes a linear-motion mechanism. The transmission mechanism 152 may further include a timing belt. The linear-motion mechanism is a mechanism that converts a rotary motion to a linear motion, and may include a ball screw and nuts. The linear-motion mechanism includes a linear-motion member 154 that moves linearly in the Z direction. The pressing member 153 is linked to the linear-motion member 154. Thus, in the first embodiment, the motor 151 can drive the pressing member 153, via the transmission mechanism 152, in the Z direction so that the pressing member 153 moves linearly in the Z direction. The pressing member 153 is a component different from the injection plunger 142, and is separated from the injection plunger 142. Thus, the pressing member 153 can be brought into contact with or separated from the injection plunger 142.

Note that a Z1 direction of the Z direction is defined as a direction in which each of the injection plunger 142 and the pressing member 153 approaches the nozzle N along the axis C1. That is, the Z1 direction is defined as a direction in which the molten resin stored in the injection cylinder 141 is injected into the cavity CV from the nozzle N of the injection cylinder 141. In addition, a Z2 direction of the Z direction is defined as a direction in which each of the injection plunger 142 and the pressing member 153 is moved away from the nozzle N along the axis C1. The Z2 direction is a direction opposite to the Z1 direction. In addition, the movement of each of the injection plunger 142 and the pressing member 153 in the Z1 direction is defined as forward movement, and the movement of each of the injection plunger 142 and the pressing member 153 in the Z2 direction is defined as backward movement. The Z1 direction is one example of a first direction, and the Z2 direction is one example of a second direction. Each of the injection plunger 142 and the pressing member 153 can move in the Z1 direction and the Z2 direction.

The pressing member 153 is driven and moved in the Z direction by the motor 151, so that the pressing member 153 can be brought into contact with or separated from the injection plunger 142. That is, the pressing member 153 is driven and moved in the Z1 direction by the motor 151, so that the pressing member 153 can press the injection plunger 142 toward the Z1 direction for moving the injection plunger 142 that is in contact with the pressing member 153, toward the Z1 direction. In addition, the pressing member 153 is driven and moved toward the Z2 direction by the motor 151, so that the pressing member 153 can be separated from the injection plunger 142. That is, the Z1 direction is a direction toward which the pressing member 153 can press the injection plunger 142, and the Z2 direction is a direction toward which the pressing member 153 can be separated from the injection plunger 142.

The inner portion 146 of the injection cylinder 141 includes a portion 148 and a portion 149. The portion 148 is a portion in which the injection plunger 142 can slide in the Z direction. The portion 149 is a portion which is positioned on the Z1 direction side with respect to the portion 148. Each of the portions 148 and 149 is a substantially cylindrical space portion. The portion 148 and the portion 149 communicate with each other. The diameter of the portion 148 is larger than the diameter of the portion 149. That is, the injection plunger 142 can move in the Z direction in the portion 148, but is prevented from moving in the Z1 direction when abutting against an abutment surface 150 that is a step portion formed between the portion 148 and the portion 149 in the injection cylinder 141. Thus, the injection plunger 142 can move in the Z direction in a space between the pressing member 153 and the abutment surface 150. However, when abutting against the pressing member 153, the injection plunger 142 is prevented from moving toward the Z2 direction beyond the pressing member 153; when abutting against the abutment surface 150, the injection plunger 142 is prevented from moving toward the Z1 direction beyond the abutment surface 150.

Each of the supply inlet S and the nozzle N communicates with the portion 149. In the portion 149, the switching valve 143 is disposed between the supply inlet S and the nozzle N. The switching valve 143 is an on-off valve. In a state where the switching valve 143 is switched and positioned at the close position, the molten resin having flowed from the plasticizing cylinder 121 to the supply inlet S through the flow channel PT1 is supplied from the supply inlet S to the portion 149, and is then supplied from the portion 149 to the portion 148.

After the molten resin is supplied to the injection cylinder 141, the switching valve 143 is switched to the open position. In a state where the switching valve 143 is switched and positioned at the open position, the injection plunger 142 is moved forward in the Z1 direction at a predetermined speed, so that the molten resin is injected from the nozzle N. When the molten resin is injected from the nozzle N, the amount of molten resin that flows backward from the injection cylinder 141 to the plasticizing cylinder 121 is reduced by the check valve 131. The molten resin having been injected from the nozzle N fills the cavity CV that communicates with the nozzle N.

The pressing member 153 is a shaft-like member that extends in the Z direction. For example, the diameter of the pressing member 153 is 10 mm. The Z direction is equal to the longitudinal direction of the pressing member 153. The back end of the inner portion 146 of the injection cylinder 141 in the Z1 direction is opened. The pressing member 153 is inserted into the injection cylinder 141 through the opening portion of the injection cylinder 141, so that a front-end portion 1531 of the pressing member 153 in the Z1 direction is located in the inner portion 146 of the injection cylinder 141. The front-end portion 1531 of the pressing member 153 in the Z1 direction is a first portion that faces the injection plunger 142. A back-end portion 1532 of the pressing member 153 in the Z1 direction is linked to the linear-motion member 154.

The injection plunger 142 is a substantially cylindrical member. The injection plunger 142 includes a back-end portion 1422 and a front-end portion 1421. The back-end portion 1422 is formed at a back end of the injection plunger 142 in the Z1 direction, and contacts the front-end portion 1531 of the pressing member 153. The front-end portion 1421 is formed at a front end of the injection plunger 142 in the Z1 direction, and contacts the molten resin injected into the injection cylinder 141. The back-end portion 1422 is one example of a second portion that faces the pressing member 153. The back-end portion 1422 is a portion opposite to the front-end portion 1421 in the Z direction. At least the front-end portion 1421 of the injection plunger 142 is located in the inner portion 146 of the injection cylinder 141. In the first embodiment, the whole of the injection plunger 142 is located in the inner portion 146 of the injection cylinder 141.

Preferably, at least one of the front-end portion 1531 and the back-end portion 1422 is spherical. Thus, the pressing member 153 and the injection plunger 142 contact each other at a point. In the first embodiment, the front-end portion 1531 is spherical, and the back-end portion 1422 is flat. Note that the back-end portion 1422 may be spherical and the front-end portion 1531 may be flat. In another case, both of the back-end portion 1422 and the front-end portion 1531 may be spherical.

The injection plunger 142 fits the inner circumferential surface 147 (or is in contact with the inner circumferential surface 147) such that the injection plunger 142 can slide in the inner portion 146 of the injection cylinder 141 in the Z direction. An inner diameter $\varphi\mathbf{1}$ of the injection cylinder 141 is larger than a diameter $\varphi\mathbf{2}$ of a portion of the injection plunger 142 that fits in the injection cylinder 141. Preferably, the difference ($\varphi\mathbf{1}-\varphi\mathbf{2}$) between the inner diameter $\varphi\mathbf{1}$ of the injection cylinder 141 and the diameter $\varphi\mathbf{2}$ of the injection plunger 142 is equal to or larger than 2 μm and equal to or smaller than 50 μm. In the first embodiment, the inner diameter $\varphi\mathbf{1}$ of the injection cylinder 141 is equal to the diameter of the portion 148 of the inner portion 146. Since the difference ($\varphi\mathbf{1}-\varphi\mathbf{2}$) is equal to or larger than 2 μm and equal to or smaller than 50 μm, the leak of the resin from the clearance between the injection cylinder 141 and the injection plunger 142 can be effectively reduced. In addition, the occurrence in which the injection plunger 142 is caught by the inner circumferential surface 147 of the injection cylinder 141, that is, the occurrence of gnawing can be effectively reduced.

For example, if the injection plunger 142 is a cylindrical member having a diameter $\varphi\mathbf{2}$ of 12 mm and a height of 15 mm, and the injection cylinder 141 has an inner diameter $\varphi\mathbf{1}$ of 12.01 mm, the difference ($\varphi\mathbf{1}-\varphi\mathbf{2}$) between the inner diameter $\varphi\mathbf{1}$ and the diameter $\varphi\mathbf{2}$ is 0.01 mm.

The diameter of the pressing member 153 is made smaller than the diameter of the injection plunger 142 so that the pressing member 153 does not contact the inner circumferential surface 147 of the injection cylinder 141. Thus, the pressing member 153 is not in contact with the injection cylinder 141. That is, the pressing member 153 is separated from the injection cylinder 141.

In the first embodiment, the manufacturing apparatus 100 further includes a sensor 155. The sensor 155 is used for detecting that the injection plunger 142 contacts the pressing member 153, or that the injection plunger 142 is separated from the pressing member 153. For example, the sensor 155 is a strain gauge disposed on the pressing member 153. By using a value detected by the sensor 155, the control apparatus 200 can determine whether the injection plunger 142 contacts the pressing member 153. Note that the sensor 155 may be any sensor as long as the sensor can detect that the injection plunger 142 contacts the pressing member 153. That is, the sensor 155 has only to be a sensor that can detect the contact and/or separation between the injection plunger 142 and the pressing member 153.

The sensor 155 is not limited to a mechanical sensor such as a strain gauge. For example, the sensor 155 may be an electromagnetic sensor, or may be an optical sensor.

The sensor 155 that is an electromagnetic sensor can detect a change in capacitance or magnetic field, which corresponds to a distance between the injection plunger 142 and the pressing member 153. In a case where the sensor 155 is disposed in the vicinity of the injection cylinder 141, the sensor 155 may be affected (or deteriorated in accuracy) by the heat from the injection cylinder 141. In consideration of this, it is preferable that a heat-insulating member be disposed between the injection cylinder 141 and the sensor 155. The material of the heat-insulating member may be glass fibers bound together with organic binder such as polyester, or inorganic binder such as silicon compound. Preferably, the material of the heat-insulating member is glass fibers bound together with the silicon-compound binder, for ensuring the heat resistance (e.g., 200° C. or more). The sensor 155 that is an electromagnetic sensor may be a sensor that detects the torque of the driving source for driving the pressing member 153. In this case, if the motor 151 is a servomotor, the sensor 155 may be a sensor that detects a servomotor current value as a distance between the injection plunger 142 and the pressing member 153.

The sensor 155 that is an optical sensor may include a light emitting portion and a light receiving portion. The light emitting portion emits light to an abutment portion (and its surroundings) between the injection plunger 142 and the pressing member 153. In a first example in which the contact and/or separation between the injection plunger 142 and the pressing member 153 is detected by the optical sensor, the light emitting portion and the light receiving portion of the sensor 155 are disposed on the same side with respect to the abutment portion between the injection plunger 142 and the pressing member 153. Part of the light emitted from the light emitting portion of the sensor 155 to the abutment portion (and its surroundings) between the injection plunger 142 and the pressing member 153 is reflected from the injection plunger 142 and/or the pressing member 153, and is detected by the light receiving portion of the sensor 155. When the injection plunger 142 and the pressing member 153 are separated from each other, a clearance is produced between the injection plunger 142 and the pressing member 153. Thus, at least one part of the light emitted from the light emitting portion passes through the clearance. Since the one part of the light is not reflected by either the injection plunger 142 or the pressing member 153, the one part of the light does not reach the light receiving portion of the sensor 155. In this theory, if the amount of light received by the light receiving portion of the sensor 155 is relatively large, the injection plunger 142 and the pressing member 153 are in contact with each other. Thus, the contact between the injection plunger 142 and the pressing member 153 can be detected by utilizing the theory. If the amount of light received by the light receiving portion of the sensor 155 is relatively small, the separation between the injection plunger 142 and the pressing member 153 can be detected. Note that although the description has been made, in the present embodiment, for the reflected light from the injection plunger 142 and/or the pressing member 153, the reflector may not necessarily be the injection plunger 142 and/or the pressing member 153 themselves. For example, the reflector may be a reflecting member that moves together with the injection plunger 142 and/or the pressing member 153.

In a second example in which the contact and/or separation between the injection plunger 142 and the pressing member 153 is detected by the optical sensor, the light emitting portion and the light receiving portion of the sensor 155 are disposed opposite to each other with respect to the abutment portion between the injection plunger 142 and the pressing member 153. Part of the light emitted from the light emitting portion of the sensor 155 to the abutment portion (and its surroundings) between the injection plunger 142 and the pressing member 153 passes through a gap between the injection plunger 142 and the pressing member 153, and is received by the light receiving portion of the sensor 155. When the injection plunger 142 and the pressing member 153 are separated from each other, a clearance is produced between the injection plunger 142 and the pressing member 153. Thus, at least one part of the light emitted from the light emitting portion passes through the clearance, and reaches the light receiving portion of the sensor 155. When the injection plunger 142 and the pressing member 153 are in contact with each other, a small or no clearance is produced between the injection plunger 142 and the pressing member 153. Thus, the at least one part of the light emitted from the light emitting portion does not reach the light receiving portion of the sensor 155. In this theory, if the amount of light received by the light receiving portion of the sensor 155 is relatively large, the injection plunger 142 and the pressing member 153 are separated from each other. Thus, the separation between the injection plunger 142 and the pressing member 153 can be detected by utilizing the theory. If the amount of light received by the light receiving portion of the sensor 155 is relatively small, the contact between the injection plunger 142 and the pressing member 153 can be detected.

In any one of the first and second examples in which the contact and/or separation between the injection plunger 142 and the pressing member 153 is detected by the optical sensor, both of the light emitting portion and the light receiving portion may be disposed so as to move together with one of the injection plunger 142 and the pressing member 153. In another case, one of the light emitting portion and the light receiving portion may be disposed so as to move together with one of the injection plunger 142 and the pressing member 153, and the other of the light emitting portion and the light receiving portion may be disposed so as to move together with the other of the injection plunger 142 and the pressing member 153. In still another case, one of the light emitting portion and the light receiving portion may be disposed on a structure that does not move together with either the injection plunger 142 or the pressing member 153. Instead of the light emitting portion, natural light produced in the installation environment of the manufacturing apparatus 100 or the light from a lighting apparatus may be used. If the sensor 155 uses modulated pulsed light, the sensor 155 can stably detect the contact and/or separation while reducing the influence caused by the disturbance light, such as the natural light produced in the installation environment of the manufacturing apparatus 100 or the light from a lighting apparatus.

Preferably, the sensor 155 in which the light emitting portion and the light receiving portion are integrated with each other is fixed to the pressing member 153, in consideration of the installation space for the sensor 155 and the influence (deterioration in accuracy) on the sensor 155 caused by the heat from the injection cylinder 141 and the injection plunger 142. In this case, the light emitting portion of the optical sensor 155 fixed to the pressing member 153 emits light to an end portion of the injection plunger 142 on the pressing member 153 side, and the light receiving portion of the optical sensor 155 detects the amount of light reflected from the injection plunger 142.

By analyzing the output from the sensor 155, the contact and/or separation between the injection plunger 142 and the pressing member 153 can be detected with binary or multivalued data. The detection of the contact and/or separation with binary data can be performed by comparing the output from the sensor 155, with a predetermined threshold value. In addition, by performing the detection of the contact and/or separation with multivalued data, the information, such as the distance between the injection plunger 142 and the pressing member 153 and the pressure applied between the injection plunger 142 and the pressing member 153, can be obtained. Furthermore, by analyzing the output from the sensor 155, various types of information can be obtained. For example, in synchronization with the output from the sensor 155, the control apparatus 200 can measure the time from the state in which the injection plunger 142 and the pressing member 153 are separated from each other until the injection plunger 142 and the pressing member 153 are in contact with each other, and/or the time from the state in which the injection plunger 142 and the pressing member 153 are in contact with each other until the injection plunger 142 and the pressing member 153 are separated from each other. In addition, based on the measured time, the control apparatus 200 can estimate the information on the sliding resistance between the injection cylinder 141 and the injection plunger 142. For estimating the information on the sliding resistance, a computation performed by using an algorithm, an LUT process, or a machine learning model can be used. These processes can be performed by the control apparatus 200. In this manner, the manufacturing apparatus 100 obtains the information on the change of sliding resistance between the injection cylinder 141 and the injection plunger 142, based on the output from the sensor 155 that changes with time. If the sliding resistance changes, the back pressure in a metering process or the absolute pressure value in a pressure holding process may change (the actual internal pressure may decrease), possibly changing the density of resin of a molded product. The density of resin of a molded product affects the quality of the molded product. For this reason, the change of quality of a molded product is detected by detecting the change of the sliding resistance by using the sensor 155. In this manner, the quality of molded products can be ensured. Specifically, the control apparatus 200 alerts (informs) an operator that the quality of molded products has changed, before defective products are mass-produced. Consequently, the number of defective products can be reduced. Thus, the failure in molding of molded products can be reduced by using the sensor 155.

Next, a method of manufacturing molded products by using the manufacturing apparatus 100, which has the above-described configuration, will be described in detail. FIGS. 2 to 5 are diagrams illustrating a manufacturing method of molded products that uses the manufacturing apparatus 100 of the first embodiment. FIGS. 2 to 5 schematically illustrate a cross section of the manufacturing apparatus 100. In the first embodiment, for controlling the motion of the pressing member 153, position and speed control is performed without performing pressure control. The manufacturing apparatus 100 of the first embodiment manufactures molded products sequentially by repeating a metering process, an injection process, and a cooling process. The manufacturing apparatus 100 of the first embodiment can be used for molding a product by using elastomer resin that does not need the pressure holding process. For metering the molten resin in the manufacturing apparatus 100 that is a pre-plunger injection molding machine, the molten resin having been plasticized by rotating the plasticizing screw 122 is conveyed to the injection cylinder 141 and stored in the inner portion 146 of the injection cylinder 141.

Figure 2:
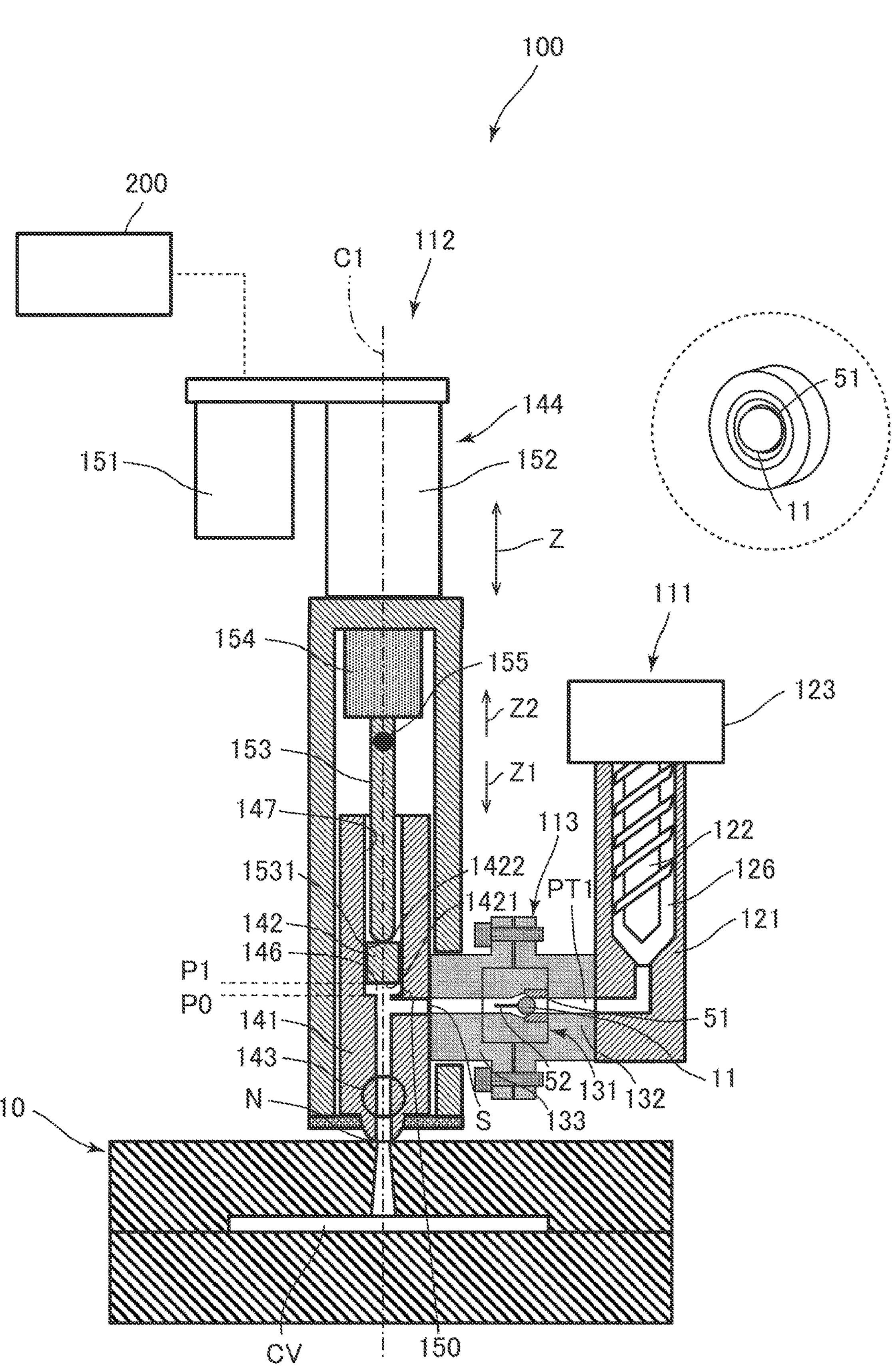
FIG. 2 is a diagram illustrating a manufacturing method of molded products that uses the manufacturing apparatus of the first embodiment.

FIG. 2 illustrates a state of the manufacturing apparatus 100 produced immediately before the start of the metering process. At a time when the injection process has been completed, that is, at a time immediately before the start of the metering process, the control apparatus 200 is stopping the rotation of the plasticizing screw 122. At the time immediately before the start of the metering process, the injection plunger 142 is stopping at a cushion position P1. The cushion position P1 is a position to which the injection plunger 142 is retracted from a cushion position P0, by a predetermined distance (e.g., 2 mm), in the Z2 direction. The cushion position P0 is a position at which the injection plunger 142 abuts against the abutment surface 150 in the inner portion 146 of the injection cylinder 141.

The ball 11 of the check valve 131 is moved toward the plasticizing screw 122; and as illustrated in a broken-line circle of FIG. 2, the flow channel PT1 is closed in a state where the ball 11 is seated on the valve seat 51. In addition, the injection plunger 142 and the pressing member 153 are in contact with each other.

Figure 3:
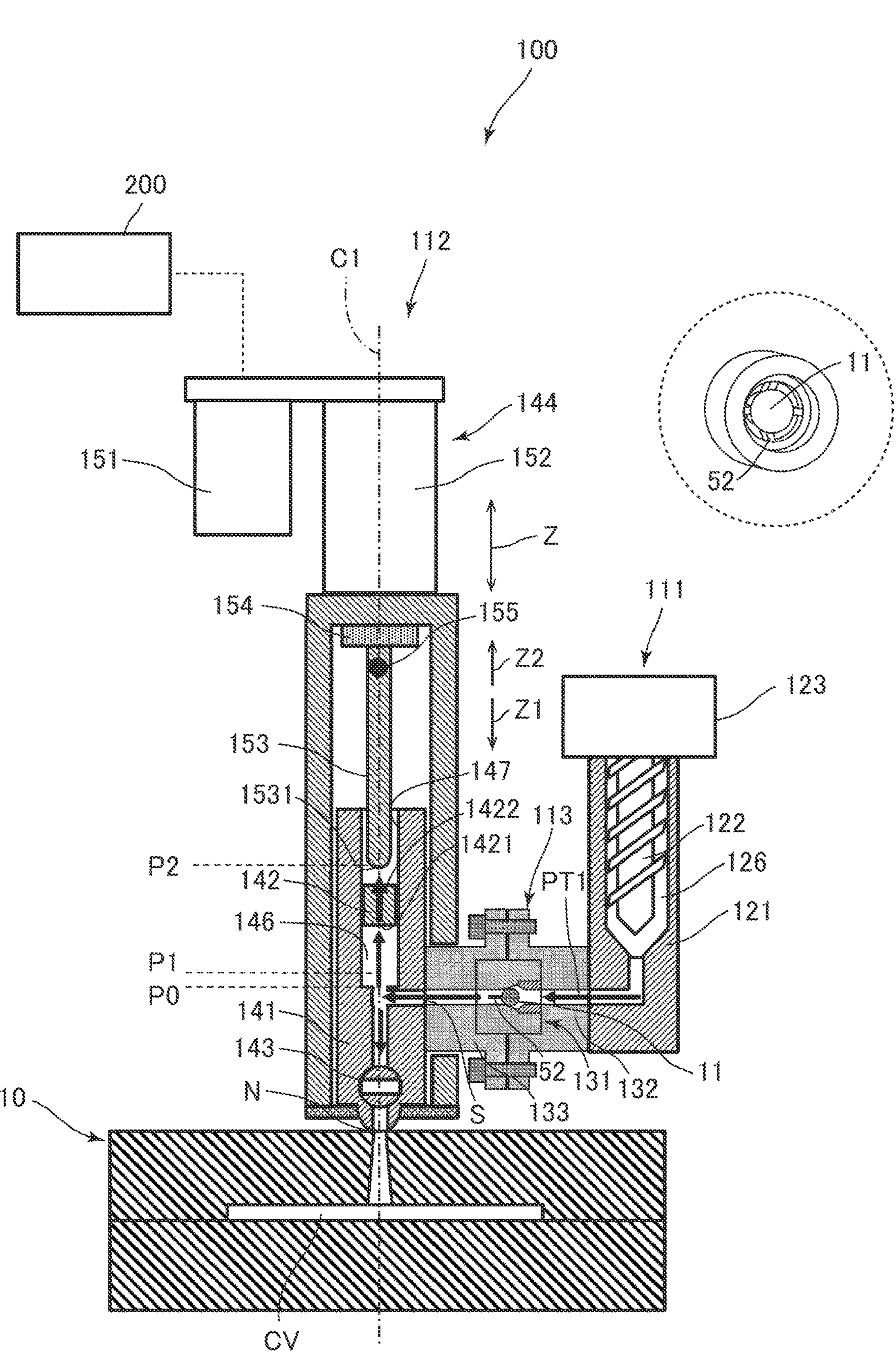
FIG. 3 is a diagram illustrating the manufacturing method of molded products that uses the manufacturing apparatus of the first embodiment.

FIG. 3 illustrates a state of the manufacturing apparatus 100 in which the metering process is being performed. The metering process is a process in which the amount of molten resin supplied from the plasticizing screw 122 to the injection cylinder 141 is measured. In the metering process, the control apparatus 200 causes the pressing member 153 to retract to a metering-completed position P2, by closing the switching valve 143 and retracting the linear-motion member 154 toward the Z2 direction by operating the motor 151. That is, in the metering process, the control apparatus 200 controls the motor 151 so that the pressing member 153 moves to the metering-completed position P2. The metering-completed position P2 is one example of a first position. For example, the metering-completed position P2 is a position separated from the cushion position P0, by 25 mm, toward the Z2 direction. The injection plunger 142 is left at the cushion position P1, and is separated from the pressing member 153.

Then, the control apparatus 200 supplies the molten resin having been plasticized by the plasticizing screw 122, into the injection cylinder 141 through the flow channel PT1, by causing the plasticizing screw 122 to rotate at a predetermined rotational speed (e.g., 50 rpm). When the control apparatus 200 supplies the molten resin into the injection cylinder 141, the ball 11 of the check valve 131 is moved toward the injection cylinder 141, and contacts the valve claws 52, as illustrated in a broken-line circle of FIG. 3. In this contact state, clearances are formed between the ball 11 and the valve claws 52, so that the flow channel PT1 is opened. The injection plunger 142 is pressed by the pressure of the molten resin that has flowed into the inner portion 146 of the injection cylinder 141 through the supply inlet S, and retracts toward the Z2 direction.

When the molten resin is supplied into the injection cylinder 141 by the plasticizing screw 122 in a state where the injection plunger 142 is separated from the pressing member 153, the injection plunger 142 is pressed by the molten resin toward the Z2 direction, and retracts toward the Z2 direction until the injection plunger 142 contacts the pressing member 153.

Figure 4:
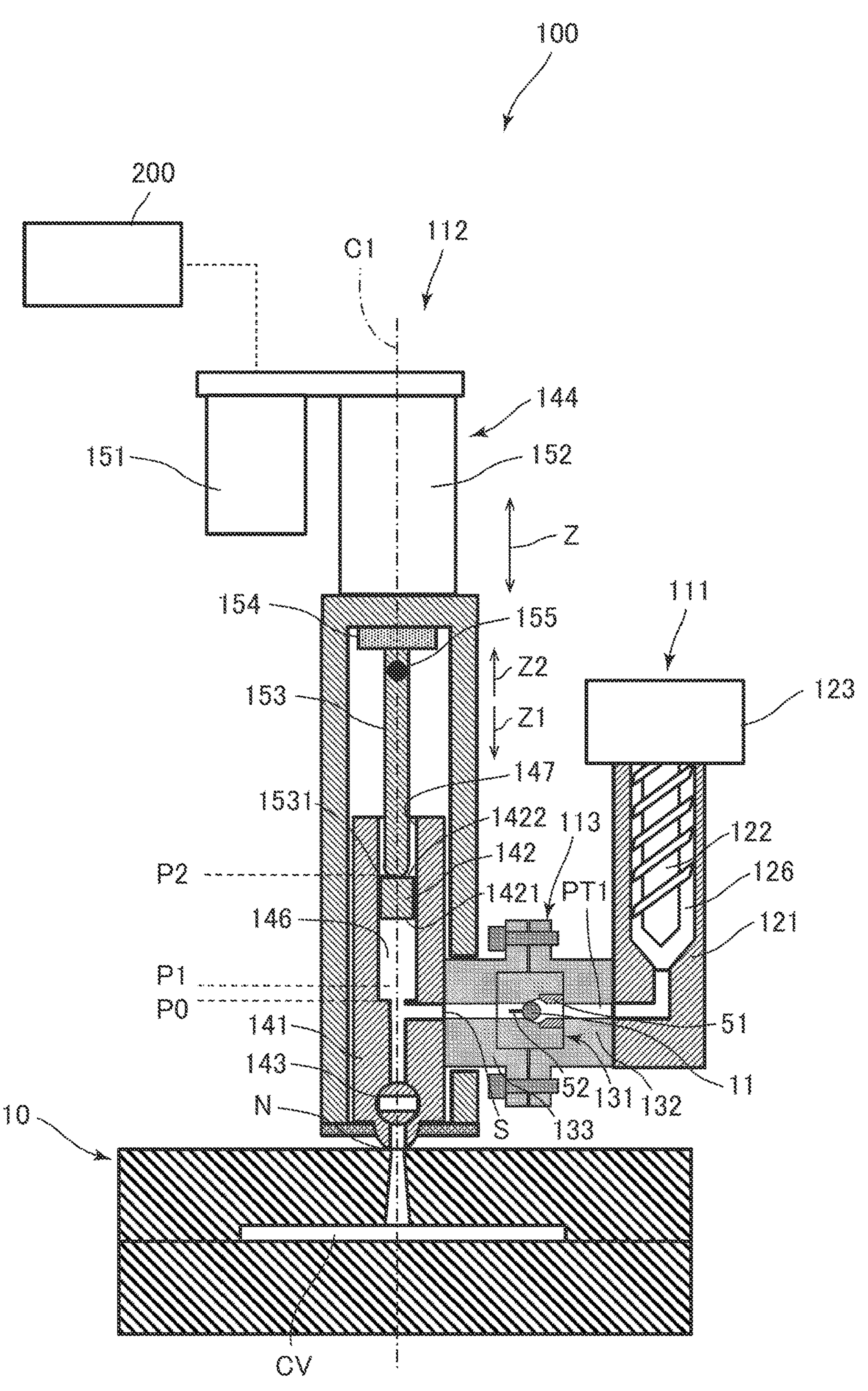
FIG. 4 is a diagram illustrating the manufacturing method of molded products that uses the manufacturing apparatus of the first embodiment.

FIG. 4 illustrates a state of the manufacturing apparatus 100 in which the metering process is completed. The control apparatus 200 determines that the metering of the molten resin is completed, by determining that the movement of the injection plunger 142 is prevented by the pressing member 153 that is located at the metering-completed position P2. The injection plunger 142 is prevented from moving toward the Z2 direction when contacting the pressing member 153. If the injection plunger 142 retracts toward the Z2 direction and contacts the pressing member 153, the detection value from the sensor 155 disposed on the pressing member 153 exceeds a threshold value. By detecting the detection value that has exceeded the threshold value, the control apparatus 200 detects that the injection plunger 142 contacts the pressing member 153. If the control apparatus 200 detects that the injection plunger 142 contacts the pressing member 153, the control apparatus 200 stops the rotation of the plasticizing screw 122. With this operation, the metering process is completed. That is, the control apparatus 200 determines that the metering of the molten resin is completed, by determining that the injection plunger 142 contacts the pressing member 153 that is located at the metering-completed position P2.

In the metering process, if the injection plunger is forced to retract by the driving mechanism, air may be sucked into the molten resin contained in the injection cylinder. There are some reasons that the air is sucked into the molten resin. For example, the air may be drawn into the interior of the injection cylinder from the clearance between the injection plunger and the injection cylinder, or from the plasticizing screw. In addition, when the pressure of the molten resin changes, air that is dissolved in the molten resin may appear as air bubbles. In any reason, if a molded product is manufactured in a state where the air is sucked into the molten resin, failure in molding, such as void or silver streak, may occur in the molded product.

In the first embodiment, however, since the injection plunger 142 is retracted in the metering process by the pressure of the resin contained in the injection cylinder 141, the amount of air sucked into the molten resin can be reduced, compared to the amount of air sucked into the molten resin when the injection plunger 142 is forced to retract.

Figure 5:
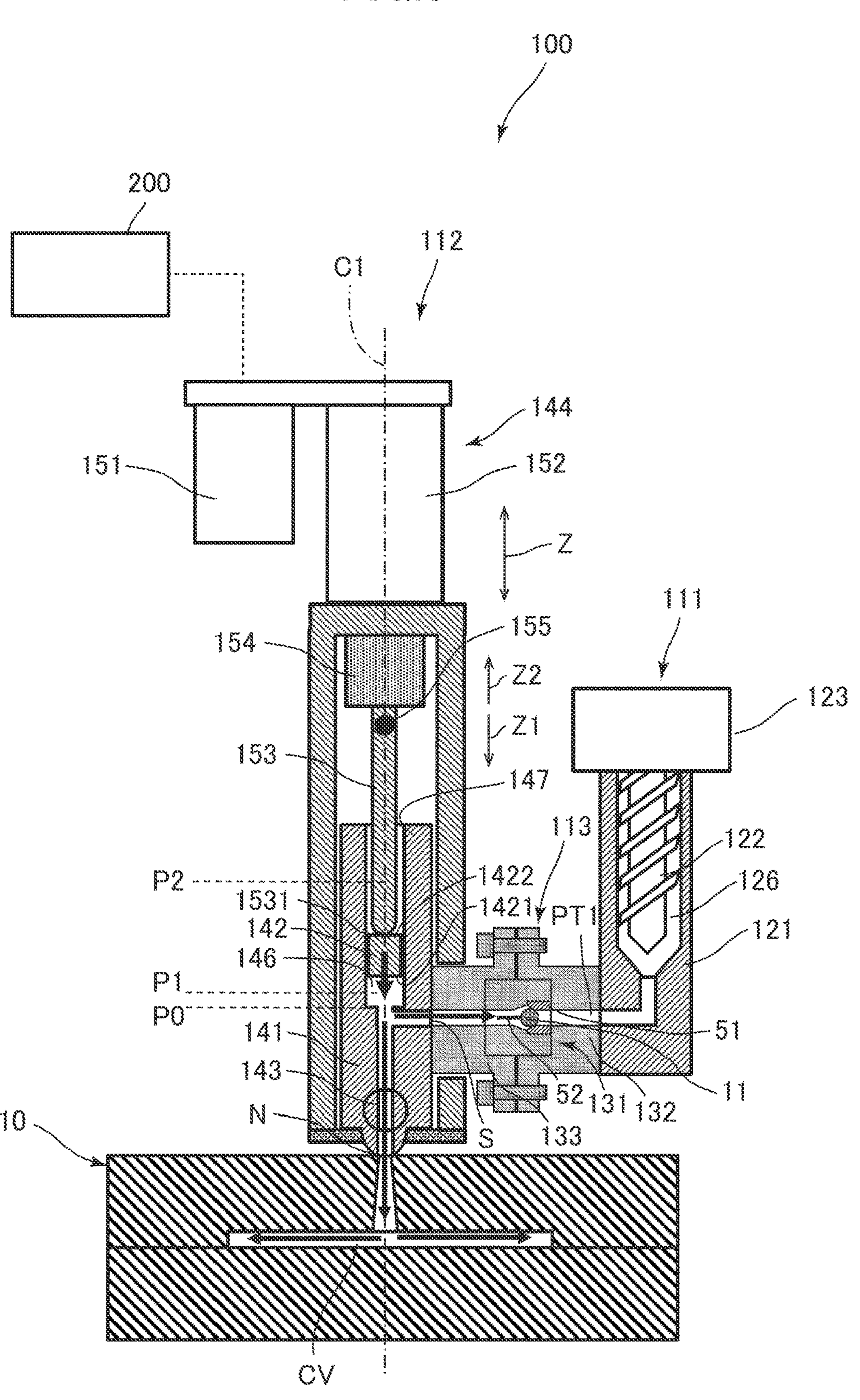
FIG. 5 is a diagram illustrating the manufacturing method of molded products that uses the manufacturing apparatus of the first embodiment.

FIG. 5 illustrates a state of the manufacturing apparatus 100 in which the injection process is being performed. In the injection process, the control apparatus 200 opens the switching valve 143, and causes the pressing member 153 to move forward in the Z1 direction at a predetermined speed (e.g., 20 mm/s). When the injection plunger 142 is pressed by the pressing member 153, which is moving forward in the Z1 direction, toward the Z1 direction, the injection plunger 142 moves forward in the Z1 direction so that the molten resin contained in the inner portion 146 of the injection cylinder 141 is injected into the cavity CV through the nozzle N. In this manner, the injection plunger 142 is pressed and moved forward by the pressing member 153 while the injection plunger 142 is in contact with the pressing member 153, so that the molten resin contained in the injection cylinder 141 is injected into the cavity CV of the mold 10. After that, when the injection plunger 142 reaches the cushion position P1, the control apparatus 200 stops the movement of the pressing member 153.

In the injection process, the resin pressure in the inner portion 146 of the injection cylinder 141 and in the flow channel PT1 increases. Thus, the ball 11 of the check valve 131 is moved toward the plasticizing screw 122, and the flow channel PT1 is closed. Since the flow channel PT1 is closed, the amount of resin that flows backward toward the plasticizing screw 122 can be reduced.

In the injection process, the pressing member 153 is applied with a strong injection reaction force. The force may bend a housing to which the transmission mechanism 152 is fixed, so that the pressing member 153 may be slightly tilted with respect to the axis C1.

In the first embodiment, however, even if the pressing member 153 is moved forward, slightly tilted, in the injection process, the outer circumferential surface of the pressing member 153 is always not in contact with the inner circumferential surface 147 of the injection cylinder 141. That is, a clearance is formed between the pressing member 153 and the injection cylinder 141 so that the pressing member 153 and the injection cylinder 141 do not contact each other.

In addition, since the front-end portion 1531 of the pressing member 153 is spherical, the front-end portion 1531 slides on the back-end portion 1422 if the pressing member 153 is moved forward, slightly tilted. Thus, the load applied to a fit portion between the injection plunger 142 and the injection cylinder 141 can be reduced. As a result, the occurrence in which the injection plunger 142 is caught by the inner circumferential surface 147 of the injection cylinder 141, that is, the occurrence of gnawing can be reduced.

After the cavity CV of the mold 10 is filled with the molten resin in the injection process, the resin contained in the mold 10 is cooled and solidified in the cooling process, for a predetermined cooling time (e.g., 7 seconds). After that, the mold 10 is opened, and the molded product is taken out from the mold 10.

By performing the above-described processes, the occurrence of failure in molding, such as void or silver streak, can be reduced in molded products, and the yield of manufacturing molded products increases.

Note that in the first embodiment, during the cooling time of the mold 10, the above-described metering process can be performed for manufacturing a next molded product.

Second Embodiment

Next, a second embodiment will be described. In the second embodiment, the description of the same features as those of the first embodiment will be simplified or omitted. FIGS. 6 to 9 are diagrams illustrating a manufacturing method of molded products that uses a manufacturing apparatus 100A of the second embodiment. FIGS. 6 to 9 schematically illustrate a cross section of the manufacturing apparatus 100A. The manufacturing apparatus 100A of the second embodiment includes a pressure sensor 161 in addition to the configuration of the manufacturing apparatus 100, which is illustrated in FIG. 1 and described in the first embodiment.

In the manufacturing apparatus 100A of the second embodiment, pressure control is performed for controlling the motion of the pressing member 153. The pressure sensor 161 is a sensor for detecting the pressure of the resin contained in the injection cylinder 141, and is disposed in the injection cylinder 141. The pressure value corresponding to the pressure detected by the pressure sensor 161 is sent to the control apparatus 200, and is processed by the control apparatus 200. The control apparatus 200 controls the motor 151 by giving a control command to the motor 151 so that the pressure in the injection cylinder 141 becomes a predetermined pressure.

The manufacturing apparatus 100A of the second embodiment manufactures molded products sequentially by repeating a metering process, a suck-back process, an injection process, a pressure holding process, and a cooling process.

Figure 6:
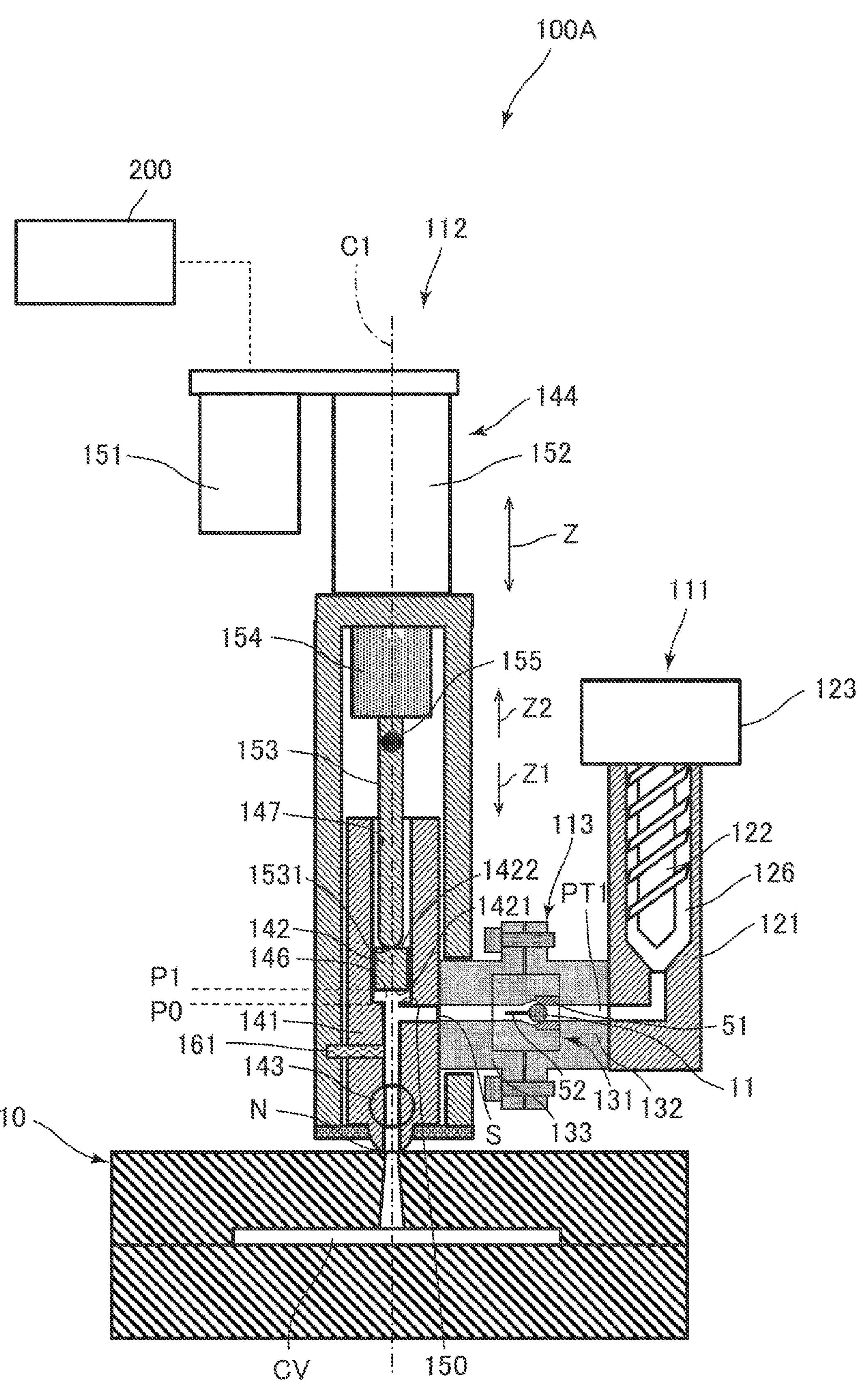
FIG. 6 is a diagram illustrating a manufacturing method of molded products that uses a manufacturing apparatus of a second embodiment.

FIG. 6 illustrates a state of the manufacturing apparatus 100A produced immediately before the start of the metering process. Note that the diameter of the plasticizing screw 122 is 32 mm, for example. For example, the outer diameter of the pressing member 153 is 18 mm. For example, the injection plunger 142 is a cylindrical member having a diameter of 20 mm and a height of 25 mm, and the injection cylinder 141 has an inner diameter of 20.01 mm. Thus, the difference between the inner diameter of the injection cylinder 141 and the diameter of the injection plunger 142 is 0.01 mm, which is in a range equal to or larger than 2 μm and equal to or smaller than 50 μm.

At a time when the injection process has been completed, that is, at a time immediately before the start of the metering process, the control apparatus 200 is stopping the rotation of the plasticizing screw 122. At the time immediately before the start of the metering process, the injection plunger 142 is stopping at a cushion position P1. The cushion position P1 is a position to which the injection plunger 142 is retracted from a cushion position P0, by a predetermined distance (e.g., 3 mm), in the Z2 direction. The cushion position P0 is a position at which the injection plunger 142 abuts against the abutment surface 150 in the inner portion 146 of the injection cylinder 141.

The ball 11 of the check valve 131 is moved toward the plasticizing screw 122, and the flow channel PT1 is closed in a state where the ball 11 is seated on the valve seat 51. In addition, the injection plunger 142 and the pressing member 153 are in contact with each other.

Figure 7:
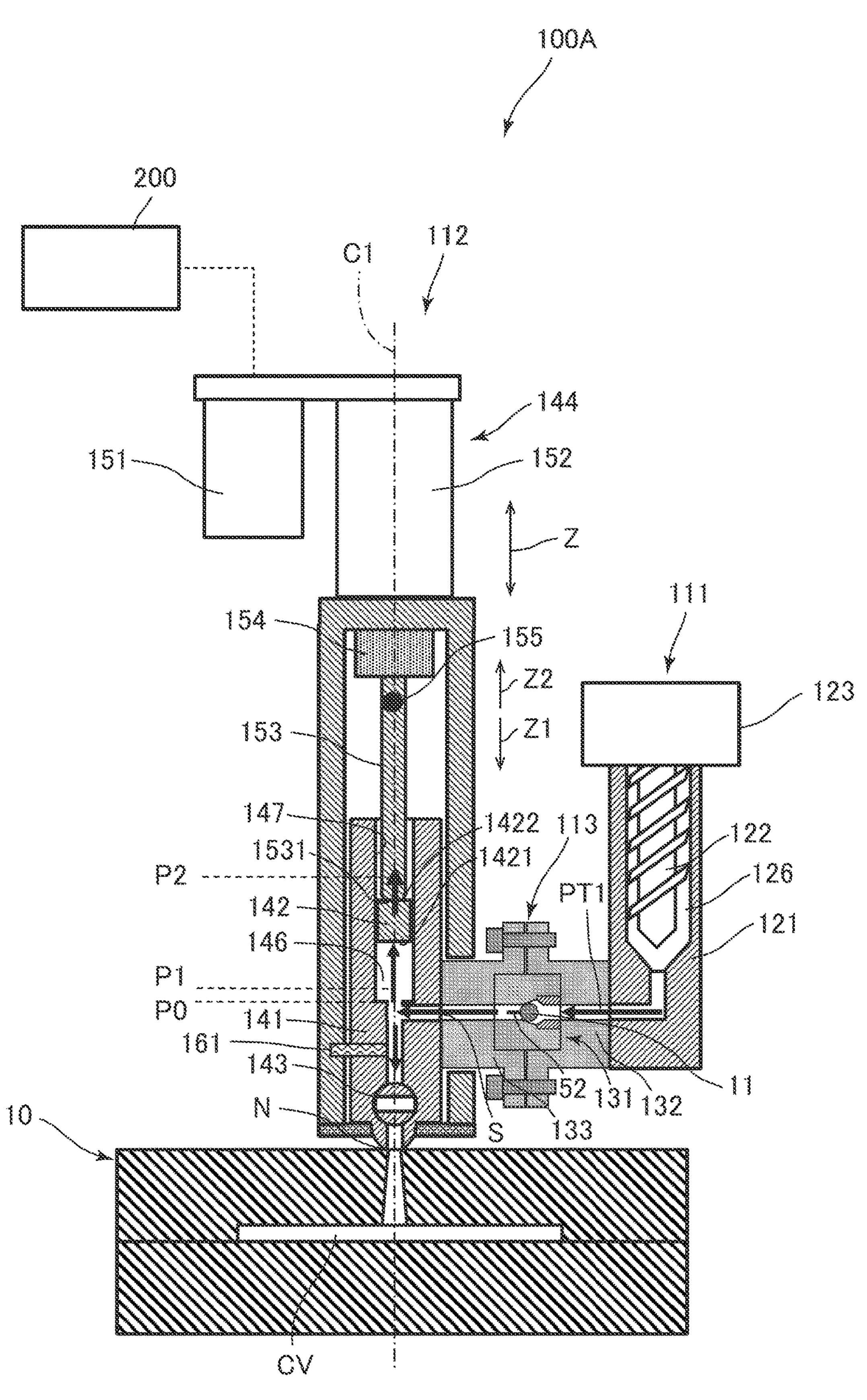
FIG. 7 is a diagram illustrating the manufacturing method of molded products that uses the manufacturing apparatus of the second embodiment.

FIG. 7 illustrates a state of the manufacturing apparatus 100A in which the metering process is being performed. In the metering process, the control apparatus 200 supplies the molten resin having been plasticized by the plasticizing screw 122, into the injection cylinder 141 through the flow channel PT1, by closing the switching valve 143 and causing the plasticizing screw 122 to rotate at a predetermined rotational speed (e.g., 100 rpm). When the control apparatus 200 supplies the molten resin into the injection cylinder 141, the ball 11 of the check valve 131 is moved toward the injection cylinder 141, and contacts the valve claws 52. In this contact state, clearances are formed between the ball 11 and the valve claws 52, so that the flow channel PT1 is opened. The molten resin flows through the check valve 131 and the supply inlet S, and flows into the injection cylinder 141. With this operation, the pressure of the resin contained in the injection cylinder 141 increases.

In the metering process, a pressure called a back pressure is applied to the injection plunger 142 by using the pressing member 153 so that the back pressure is applied to the molten resin that flows into the injection cylinder 141 due to the rotation of the plasticizing screw 122. That is, the control apparatus 200 moves the pressing member 153 toward the Z2 direction so that the pressure in the injection cylinder 141 is kept constant (for example, at a back pressure of 1 MPa). Specifically, the control apparatus 200 causes the pressing member 153 to retract toward the Z2 direction, by rotating the plasticizing screw 122, in a state where the back-end portion 1422 and the front-end portion 1531 are in contact with each other and where the pressure of the molten resin is kept constant.

When the pressing member 153 reaches the metering-completed position P2, the control apparatus 200 ends the metering process. Thus, in the metering process, the control apparatus 200 controls the motor 151 so that the pressing member 153 moves to the metering-completed position P2. The metering-completed position P2 is one example of a first position. For example, the metering-completed position P2 is a position separated from the cushion position P0, by 60 mm, toward the Z2 direction. After that, the control apparatus 200 proceeds to the suck-back process.

Figure 8:
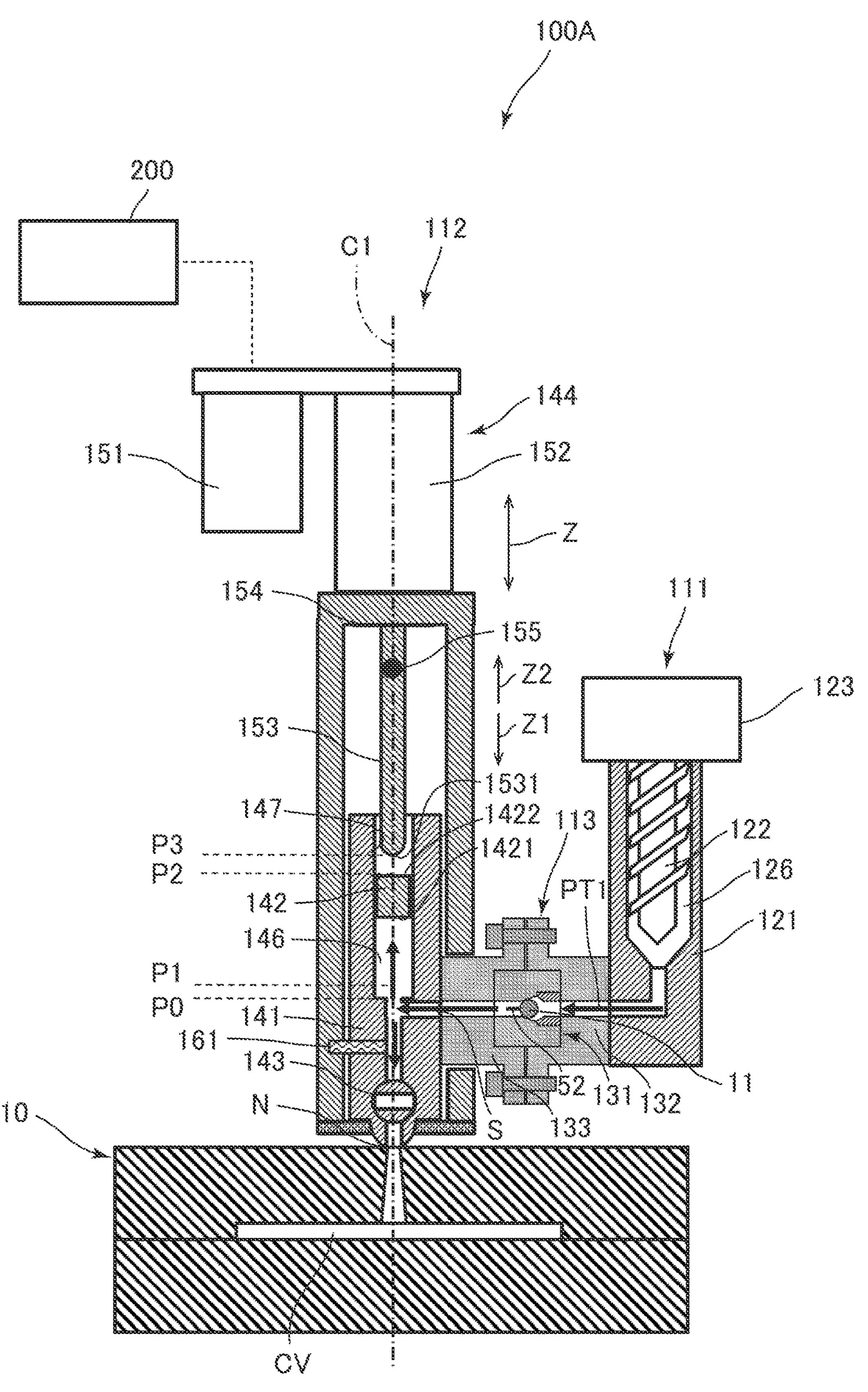
FIG. 8 is a diagram illustrating the manufacturing method of molded products that uses the manufacturing apparatus of the second embodiment.

FIG. 8 illustrates a state of the manufacturing apparatus 100A in which the suck-back process is being performed. The suck-back process is performed for reducing the failure in molding, such as resin leak, or drooling, from the nozzle N and jetting that may occur in a next injection process. Specifically, in the suck-back process, the pressure of the resin contained in the injection cylinder 141 is decreased after the completion of the metering process.

In the suck-back process, the control apparatus 200 controls the motor 151 so that the pressing member 153 retracts from the metering-completed position P2 to a suck-back-completed position P3 in the Z2 direction. The suck-back-completed position P3 is one example of a second position. For example, the suck-back-completed position P3 is a position separated from the cushion position P0, by 65 mm, toward the Z2 direction.

When the pressing member 153 is retracted, the injection plunger 142 and the pressing member 153 are separated from each other, and the pressing member 153 is retracted to the suck-back-completed position P3 earlier than the injection plunger 142 is retracted to the suck-back-completed position P3. After the pressing member 153 is retracted to the suck-back-completed position P3, the injection plunger 142 is pressed by the molten resin contained in the injection cylinder 141, then retracted to the suck-back-completed position P3, and then brought into contact with the pressing member 153 again. In this manner, the suck-back process is performed for reducing the occurrence of the drooling and jetting.

In the second embodiment, in the suck-back process, the injection plunger 142 is not forced to retract by the driving mechanism or the like, but is retracted by the resin pressure of the molten resin. Thus, the injection plunger 142 retracts in the suck-back process, while opposing the pressure of the resin contained in the injection cylinder 141. As a result, no gap is produced between the molten resin and the front-end portion 1421 of the injection plunger 142, so that the air sucked into the molten resin can be reduced.

Figure 9:
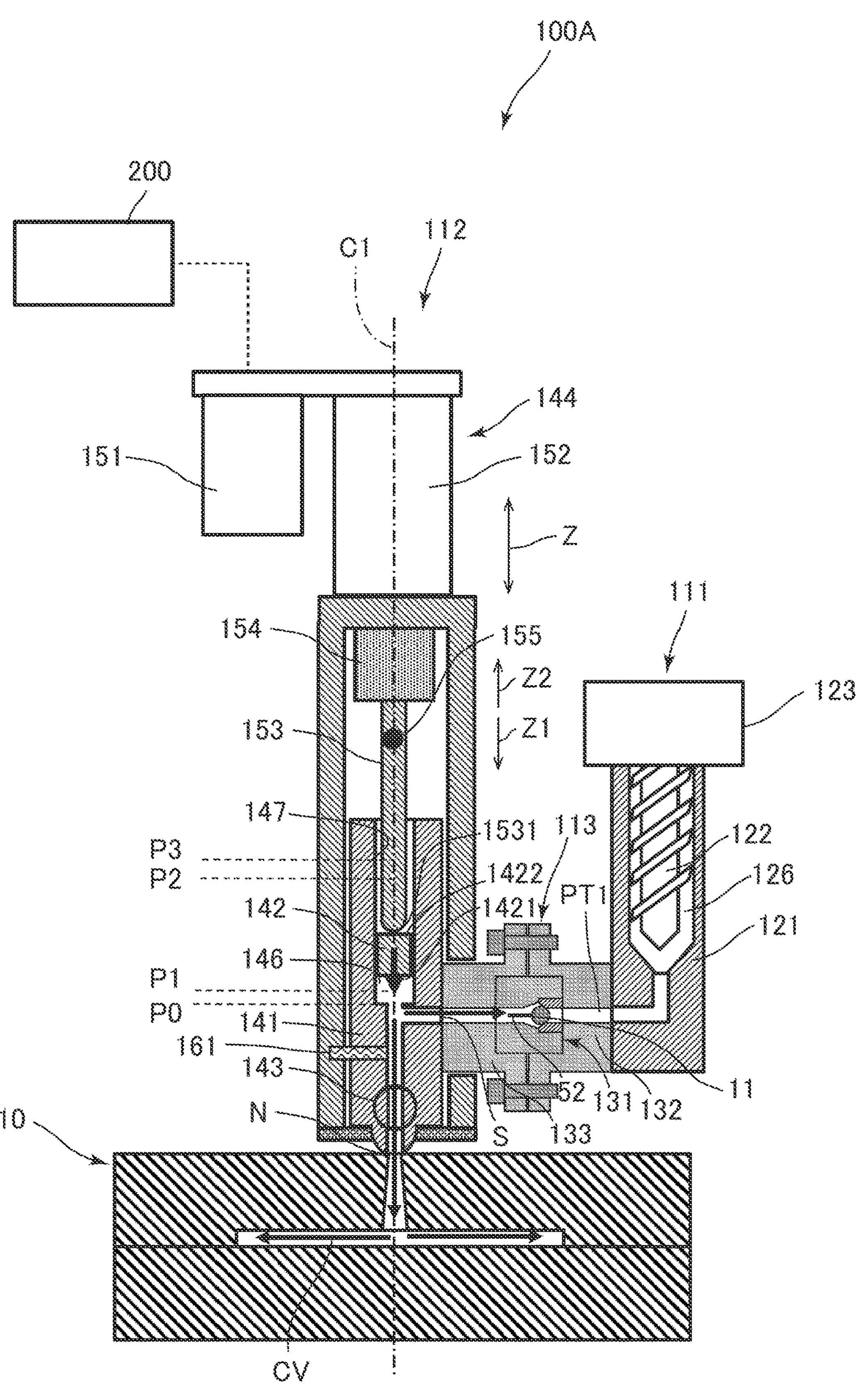
FIG. 9 is a diagram illustrating the manufacturing method of molded products that uses the manufacturing apparatus of the second embodiment.

FIG. 9 illustrates a state of the manufacturing apparatus 100A in which the injection process is being performed. In the injection process, the control apparatus 200 opens the switching valve 143, and causes the pressing member 153 to move forward in the Z1 direction at a predetermined speed (e.g., 30 mm/s). In this manner, the injection plunger 142 is pressed and moved forward by the pressing member 153 while the injection plunger 142 is in contact with the pressing member 153, so that the molten resin contained in the injection cylinder 141 is injected into the cavity CV of the mold 10. After that, when the injection plunger 142 reaches the cushion position P1, the control apparatus 200 stops the movement of the pressing member 153.

In the injection process, the resin pressure in the inner portion 146 of the injection cylinder 141 and in the flow channel PT1 increases. Thus, the ball 11 of the check valve 131 is moved toward the plasticizing screw 122, and the flow channel PT1 is closed. Since the flow channel PT1 is closed, the amount of resin that flows backward toward the plasticizing screw 122 can be reduced.

After the cavity CV of the mold 10 is filled with the resin in the injection process, the control apparatus 200 proceeds to the pressure holding process. In the pressure holding process, the control apparatus 200 controls the motor 151 for the pressing member 153 to press the injection plunger 142, so that the pressure in the injection cylinder 141 is kept constant (for example, at a holding pressure of 50 MPa) for compensating the contraction of the molded product that is in the cavity CV (the contraction is caused by cooling the molded product). After the completion of the pressure holding process, the molded product in the mold 10 is cooled in the cooling process, for a predetermined cooling time (e.g., 10 seconds). After that, the mold 10 is opened, and the molded product is taken out from the mold 10.

By performing the above-described processes, the occurrence of failure in molding, such as void or silver streak, can be reduced in molded products, and the yield of manufacturing molded products increases.

In the second embodiment, during the cooling time of the mold 10, the above-described metering process and suck-back process can be performed for manufacturing a next molded product.

Third Embodiment

Next, a third embodiment will be described. In the third embodiment, the description will be made for a manufacturing apparatus that is a family molding apparatus. The family molding apparatus is one example of injection molding apparatuses, and includes a mold that can mold a plurality of molded products having different shapes. The mold is structured so that a plurality of cavities is defined.

Figure 10:
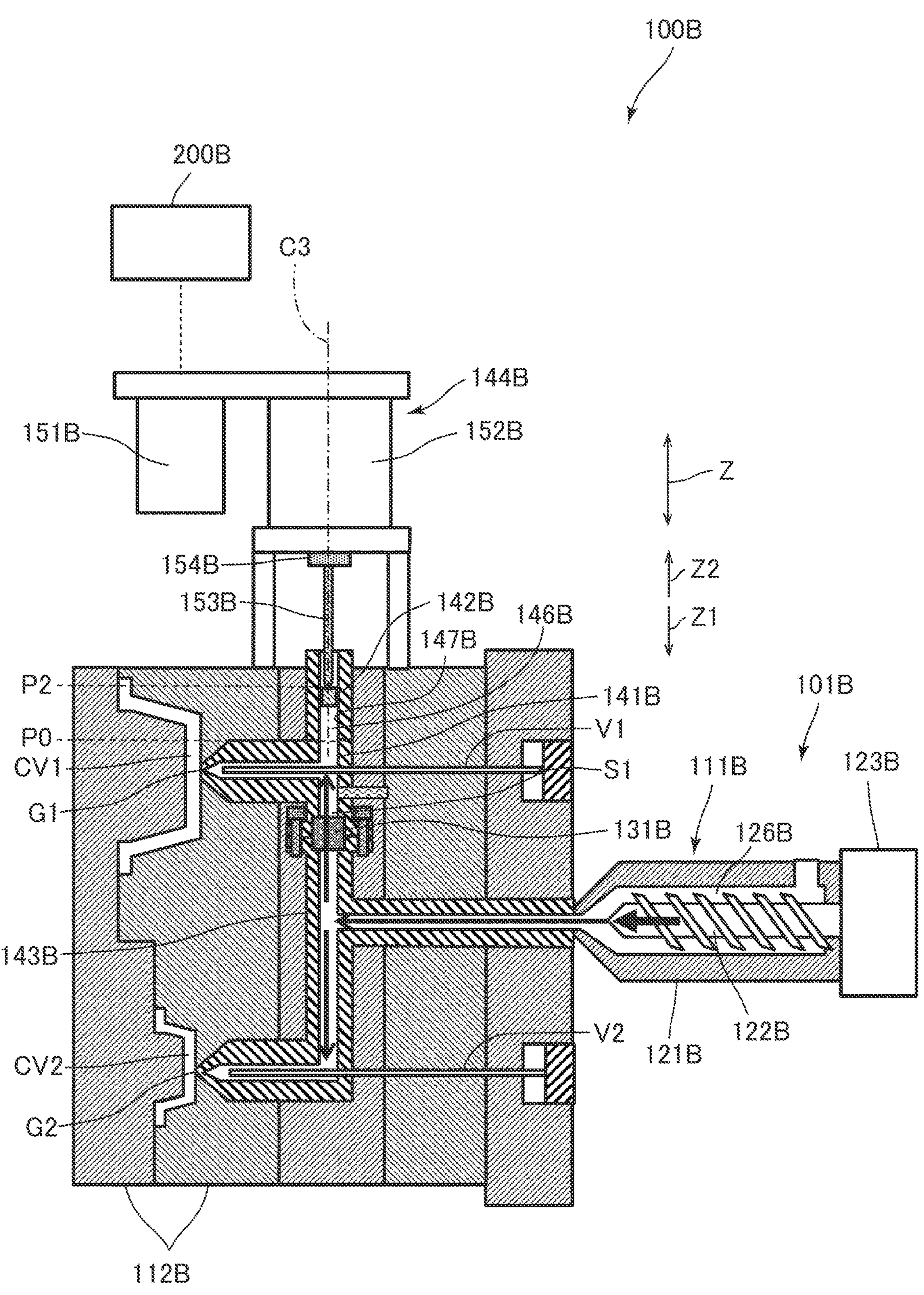
FIG. 10 is a diagram illustrating a manufacturing method of molded products that uses a manufacturing apparatus of a third embodiment.
Figure 11:
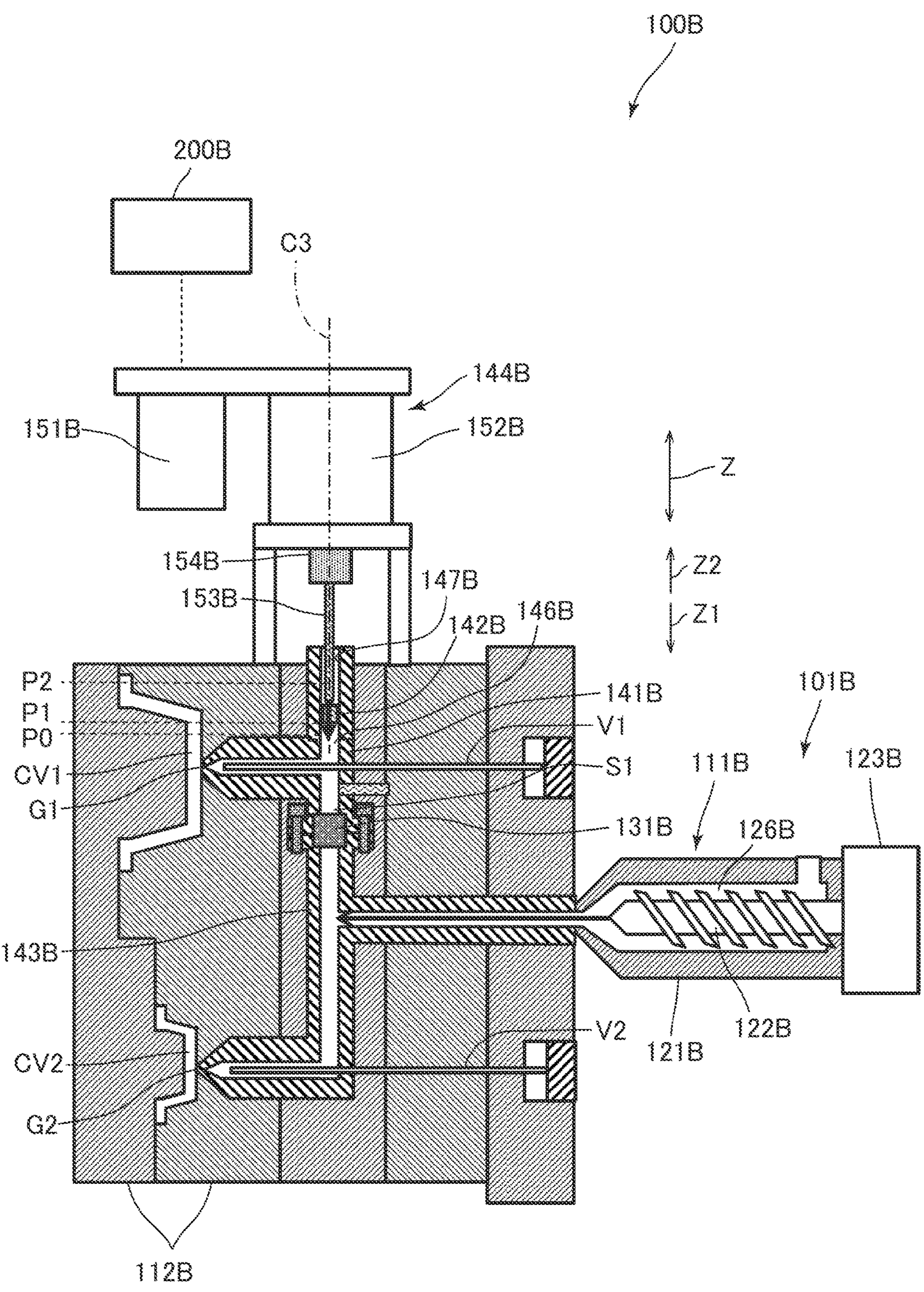
FIG. 11 is a diagram illustrating the manufacturing method of molded products that uses the manufacturing apparatus of the third embodiment.
Figure 12:
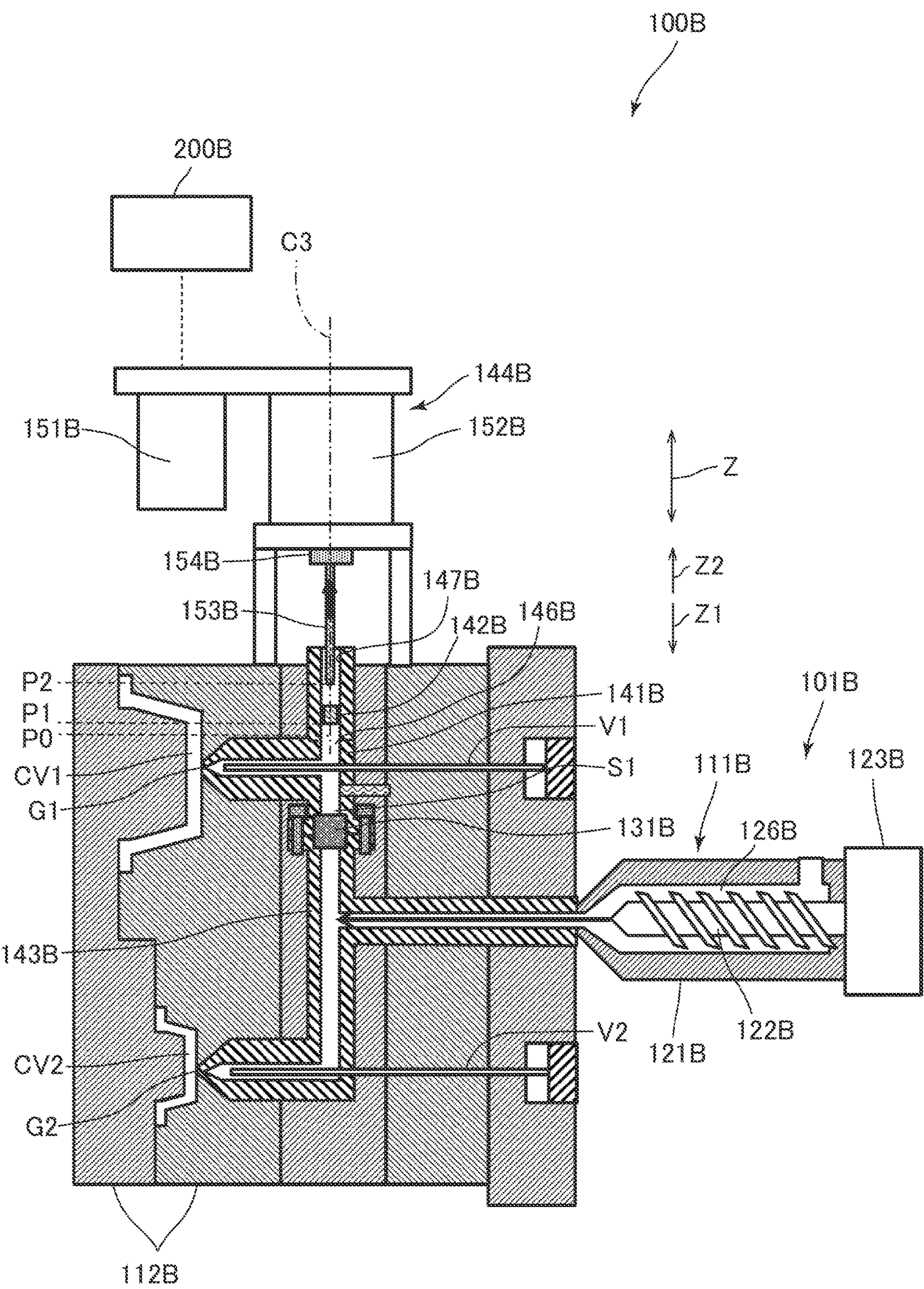
FIG. 12 is a diagram illustrating the manufacturing method of molded products that uses the manufacturing apparatus of the third embodiment.

FIGS. 10 to 12 are diagrams illustrating a manufacturing method of molded products that uses a manufacturing apparatus 100B of the third embodiment. FIGS. 10 to 12 schematically illustrate a cross section of the manufacturing apparatus 100B. FIG. 10 illustrates a state where the manufacturing apparatus 100B is performing a below-described injection process. FIG. 11 illustrates a state where the manufacturing apparatus 100B is performing a below-described pressure holding process. FIG. 12 illustrates a state where the manufacturing apparatus 100B is performing a below-described metering process.

The manufacturing apparatus 100B includes an injection molding machine 101B, a mold 112B, and a control apparatus 200B. In the mold 112B, a cavity CV1 and a cavity CV2 are defined. The cavity CV1 is a first cavity, and the cavity CV2 is a second cavity. The cavity CV1 and the cavity CV2 have shapes or sizes different from each other. In the pressure holding process, the cavity CV1 and the cavity CV2 are applied with holding pressures different from each other.

The control apparatus 200B is one example of a control portion. For example, the control apparatus 200B is one or more computers, each including a processor. The control apparatus 200B can control the whole of the manufacturing apparatus.

For example, the injection molding machine 101B is an in-line screw injection molding machine. The operation of the injection molding machine 101B is controlled by the control apparatus 200B. The injection molding machine 101B includes a plasticizing portion 111B and an injection portion 123B. The molten resin supplied to the mold 112B by the injection molding machine 101B fills each of the cavities CV1 and CV2.

The plasticizing portion 111B includes a hopper (not illustrated), a plasticizing cylinder 121B, and a plasticizing screw 122B. For example, pellet-shaped resin material is put in the hopper (not illustrated). For example, the resin material is made of thermoplastic resin, such as polyphenylene ether (PPE). The temperature of the plasticizing cylinder 121B is adjusted into a temperature at which the supplied resin material is plasticized, by the plasticizing cylinder 121B being heated by a heater (not illustrated). The plasticizing screw 122B is disposed in an inner portion 126B of the plasticizing cylinder 121B. The plasticizing screw 122B is a screw that can rotate and move forward and backward. For example, the diameter of the plasticizing screw 122B is 36 mm.

The injection portion 123B includes a motor (not illustrated), and moves the plasticizing screw 122B forward and backward while rotating the plasticizing screw 122B. The molten resin can be injected into the mold 112B by the injection portion 123B moving the plasticizing screw 122B forward. The injection portion 123B is controlled by the control apparatus 200B.

The manufacturing apparatus 100B includes an injection cylinder 141B, an injection plunger 142B, a hot runner 143B, and an injection driving portion 144B. The operation of the injection driving portion 144B is controlled by the control apparatus 200B. The injection cylinder 141B includes a supply inlet S1 through which the molten resin is supplied, and a gate G1 through which the molten resin is injected into the cavity CV1. The gate G1 is one example of an injection outlet. An inner portion 146B of the injection cylinder 141B and the cavity CV1 communicate with each other via the gate G1. Preferably, the material of each of the injection cylinder 141B and the injection plunger 142B is a metal.

The hot runner 143B is an injection cylinder. The supply inlet of the molten resin disposed in the hot runner 143B is connected with the plasticizing cylinder 121B. The hot runner 143B includes a gate G2 through which the molten resin is injected into the cavity CV2. The gate G2 is one example of an injection outlet. An inner portion of the hot runner 143B and the cavity CV2 communicate with each other via the gate G2.

In addition, the manufacturing apparatus 100B includes a valve pin V1 that opens and closes the gate G1, and a valve pin V2 that opens and closes the gate G2. The valve pin V1 is a valve that blocks the molten resin from flowing from the gate G1 to the outside of the injection cylinder 141B. The valve pin V2 is a valve that blocks the molten resin from flowing from the gate G2 to the outside of the hot runner 143B. The operation of the valve pins V1 and V2 is controlled by the control apparatus 200B.

The hot runner 143B and the injection cylinder 141B are connected with each other via a check valve 131B. The check valve 131B has the same structure as that of the check valve 131 described in the first and the second embodiments. The check valve 131B is connected to the supply inlet S1, and is oriented so that the molten resin does not flow backward from the injection cylinder 141B to the hot runner 143B. Since the check valve 131B is disposed and connected to the supply inlet S1, the molten resin flows in a forward direction from the hot runner 143B toward the injection cylinder 141B, but does not flow in a reverse direction from the injection cylinder 141B toward the hot runner 143B. The resin having been melted and plasticized by the plasticizing screw 122B is supplied to the inner portion 146B of the injection cylinder 141B through the hot runner 143B, the check valve 131B, and the supply inlet S1 of the injection cylinder 141B. In this manner, the molten resin supplied from the plasticizing screw 122B can be stored in the inner portion 146B of the injection cylinder 141B.

The injection cylinder 141 includes an inner circumferential surface 147B that defines an internal space. The injection plunger 142B is disposed so as to fit in the injection cylinder 141B such that the injection plunger 142B can move with respect to the injection cylinder 141B in a Z direction that is a direction of the axis C3.

The injection driving portion 144B includes a motor 151B, a transmission mechanism 152B, and a pressing member 153B. The motor 151B is one example of a driving source. Preferably, the material of the pressing member 153B is a metal. The motor 151B may be a rotary motor, and is controlled by the control apparatus 200B. The transmission mechanism 152B is a mechanism that transmits the driving force of the motor 151B to the pressing member 153B. For example, the transmission mechanism 152B includes a linear-motion mechanism. The transmission mechanism 152B may also include a timing belt. The linear-motion mechanism is a mechanism that converts a rotary motion to a linear motion, and may include a ball screw and nuts.

The linear-motion mechanism includes a linear-motion member 154B that moves linearly in the Z direction. The pressing member 153B is linked to the linear-motion member 154B. Thus, in the third embodiment, the motor 151B can drive the pressing member 153B, via the transmission mechanism 152B, in the Z direction so that the pressing member 153B moves linearly in the Z direction. The pressing member 153B is a component different from the injection plunger 142B, and is separated from the injection plunger 142B. Thus, the pressing member 153B can be brought into contact with or separated from the injection plunger 142B.

Note that a Z1 direction of the Z direction is defined as a direction toward which each of the injection plunger 142B and the pressing member 153B approaches the gate G1 along the axis C3. That is, the Z1 direction is defined as a direction in which the molten resin stored in the injection cylinder 141B is injected into the cavity CV1 from the gate G1. In addition, a Z2 direction of the Z direction is defined as a direction toward which each of the injection plunger 142B and the pressing member 153B is moved away from the gate G1 along the axis C3. The Z2 direction is a direction opposite to the Z1 direction. In addition, the movement of each of the injection plunger 142B and the pressing member 153B toward the Z1 direction is defined as forward movement, and the movement of each of the injection plunger 142B and the pressing member 153B toward the Z2 direction is defined as backward movement. The Z1 direction is one example of a first direction, and the Z2 direction is one example of a second direction. Each of the injection plunger 142B and the pressing member 153B can move in the Z1 direction and the Z2 direction.

The pressing member 153B is driven and moved in the Z direction by the motor 151B, so that the pressing member 153B can be brought into contact with or separated from the injection plunger 142B. That is, the pressing member 153B is driven and moved toward the Z1 direction by the motor 151B, so that the pressing member 153B can press the injection plunger 142B toward the Z1 direction for moving the injection plunger 142B that is in contact with the pressing member 153B, toward the Z1 direction. In addition, the pressing member 153B is driven and moved toward the Z2 direction by the motor 151B, so that the pressing member 153B can be separated from the injection plunger 142B. That is, the Z1 direction is a direction toward which the pressing member 153B presses the injection plunger 142B, and the Z2 direction is a direction toward which the pressing member 153B can be separated from the injection plunger 142B.

The inner portion 146B of the injection cylinder 141B is a substantially cylindrical space portion in which the injection plunger 142B can slide in the Z direction.

The pressing member 153B is a shaft-like member that extends in the Z direction. The Z direction is equal to the longitudinal direction of the pressing member 153B. The back end of the inner portion 146B of the injection cylinder 141B in the Z1 direction is opened. The pressing member 153B is inserted into the injection cylinder 141B through the opening portion of the injection cylinder 141B, so that the front-end portion of the pressing member 153B in the Z1 direction is located in the inner portion 146B of the injection cylinder 141B. The front-end portion of the pressing member 153B in the Z1 direction is a first portion that faces the injection plunger 142B. The back-end portion of the pressing member 153B in the Z1 direction is linked to the linear-motion member 154B.

The injection plunger 142B is a substantially cylindrical member. For example, the diameter of the injection plunger 142B is 8 mm. The injection plunger 142B includes a back-end portion and a front-end portion. The back-end portion is formed at a back end of the injection plunger 142B in the Z1 direction, and contacts the front-end portion of the pressing member 153B. The front-end portion is formed at a front end of the injection plunger 142B in the Z1 direction, and contacts the molten resin injected into the injection cylinder 141B. The back-end portion of the injection plunger 142B is one example of a second portion that faces the pressing member 153B. The back-end portion of the injection plunger 142B is a portion opposite to the front-end portion of the injection plunger 142B in the Z direction. At least the front-end portion of the injection plunger 142B is located in the inner portion 146B of the injection cylinder 141B. In the third embodiment, the whole of the injection plunger 142B is located in the inner portion 146B of the injection cylinder 141B.

Preferably, at least one of the front-end portion of the pressing member 153B and the back-end portion of the injection plunger 142B is spherical. Thus, the pressing member 153B and the injection plunger 142B contact each other at a point. In the third embodiment, the front-end portion of the pressing member 153B is spherical, and the back-end portion of the injection plunger 142B is flat. Note that the back-end portion of the injection plunger 142B may be spherical and the front-end portion of the pressing member 153B may be flat. In another case, both of the back-end portion of the injection plunger 142B and the front-end portion of the pressing member 153B may be spherical.

The injection plunger 142B fits the inner circumferential surface 147B (or is in contact with the inner circumferential surface 147B) such that the injection plunger 142B can slide in the inner portion 146B of the injection cylinder 141B in the Z direction. The inner diameter of the injection cylinder 141B is larger than the diameter of a portion of the injection plunger 142B that fits in the injection cylinder 141B. Preferably, the difference between the inner diameter of the injection cylinder 141B and the diameter of the portion of the injection plunger 142B that fits in the injection cylinder 141B is equal to or larger than 2 μm and equal to or smaller than 50 μm. Since the difference is equal to or larger than 2 μm and equal to or smaller than 50 μm, the leak of the resin from the clearance between the injection cylinder 141B and the injection plunger 142B can be effectively reduced. In addition, the occurrence in which the injection plunger 142B is caught by the inner circumferential surface 147B of the injection cylinder 141B, that is, the occurrence of gnawing can be effectively reduced.

The diameter of the pressing member 153B is made smaller than the diameter of the injection plunger 142B so that the pressing member 153B does not contact the inner circumferential surface 147B of the injection cylinder 141B. Thus, the pressing member 153B is not in contact with the injection cylinder 141B. That is, the pressing member 153B is separated from the injection cylinder 141B.

Next, a method of manufacturing molded products by using the manufacturing apparatus 100B, which has the above-described configuration, will be described. FIG. 10 illustrates a state of the manufacturing apparatus 100B in which the injection process is being performed. In the injection process, the control apparatus 200B opens the gate G1 that leads to the cavity CV1, in a state where the gate G2 that leads to the cavity CV2 is closed, and moves the plasticizing screw 122B of the injection molding machine 101B forward at a predetermined speed (e.g., 50 mm/s). The molten resin injected from the injection molding machine 101B flows a flow channel formed in the hot runner 143B, and passes through the check valve 131B. The molten resin having passed through the check valve 131B passes through the gate G1, and fills the cavity CV1. The control apparatus 200B opens the gate G2 at a timing at which the capacity of the part of the cavity CV1 that contains no molten resin becomes equal to a predetermined cavity (e.g., 30 cc). With this operation, the molten resin flows also into the cavity CV2, so that the cavities CV1 and CV2 having different capacities can be filled up with the molten resin at the same time. When the cavities CV1 and CV2 have been filled up with the molten resin, the front-end portion of the pressing member 153B is kept at the metering-completed position P2, and the injection plunger 142B and the pressing member 153B are in contact with each other. The metering-completed position P2 is one example of a first position. For example, the metering-completed position P2 is a position separated from the cushion position P0, by 20 mm, toward the Z2 direction.

FIG. 11 illustrates a state of the manufacturing apparatus 100B in which the pressure holding process is being performed. In the pressure holding process, the control apparatus 200B applies a first holding pressure to the cavity CV1 by controlling the injection driving portion 144B, and applies a second holding pressure lower than the first holding pressure, to the cavity CV2 by controlling the injection molding machine 101B. In the pressure holding process, the control apparatus 200B applies a predetermined holding pressure (e.g., 80 MPa) to the flow channel of the injection cylinder 141B for a predetermined time (e.g., 3 seconds) by causing the pressing member 153B to press the injection plunger 142B. On the other hand, the control apparatus 200B causes the plasticizing screw 122B of the injection molding machine 101B to apply a predetermined pressure (e.g., 50 MPa) to the flow channel of the hot runner 143B for a predetermined time (e.g., 3 seconds). In the pressure holding process, the pressure of the resin located on the side toward which the resin has flowed out of the check valve 131B is larger than the pressure of the resin located on the side from which the resin has flowed into the check valve 131B. Thus, the check valve 131B is closed. As a result, the holding pressure of 80 MPa applied by the injection plunger 142B is applied to the cavity CV1, and the holding pressure of 50 MPa applied by the plasticizing screw 122B of the injection molding machine 101B is applied to the cavity CV2. After the pressure holding process is completed, the gates G1 and G2 are closed. When the pressure holding process has been completed, the injection plunger 142B is located at a cushion position P1. For example, the cushion position P1 is a position separated from the cushion position P0, by 2 mm, toward the Z2 direction.

FIG. 12 illustrates a state of the manufacturing apparatus 100B in which the metering process is being performed. In the metering process, the control apparatus 200B retracts the pressing member 153B to the metering-completed position P2 by operating the motor 151B. When the pressing member 153B is retracted to the metering-completed position P2, the injection plunger 142 is left at or near the cushion position P1 and separated from the pressing member 153B. After that, the control apparatus 200B applies a back pressure of 2 MPa by rotating the plasticizing screw 122B of the injection molding machine 101B at a predetermined rotational speed (e.g., 100 rpm). As a result, the pressure of the resin located on the side toward which the resin has flowed out of the check valve 131B becomes smaller than the pressure of the resin located on the side from which the resin has flowed into the check valve 131B. Thus, the check valve 131B is opened, and the molten resin having been melted and plasticized by the plasticizing screw 122B of the injection molding machine 101B passes through the hot runner 143B, and flows into the inner portion of the injection cylinder 141B. In addition, by the pressure of the molten resin having flowed into the inner portion of the injection cylinder 141B, the injection plunger 142B is pressed toward the Z2 direction, and retracted until the injection plunger 142B contacts the pressing member 153B that is stopping at the metering-completed position P2. On the other hand, the plasticizing screw 122B of the injection molding machine 101B continues to move backward, while rotating, until the metering of the amount of resin necessary for the next shot is completed. After the metering performed by the injection molding machine 101B is completed, and the cooling time has elapsed, molded products are taken out from the cavities CV1 and CV2. After that, the control apparatus 200B proceeds to the injection process again.

In the third embodiment, since the injection plunger 142B is retracted in the metering process by the pressure of the resin contained in the injection cylinder 141B, the amount of air sucked into the molten resin can be reduced, compared to the amount of air sucked into the molten resin when the injection plunger 142B is forced to retract.

By performing the above-described processes, the occurrence of failure in molding, such as void or silver streak, can be reduced in molded products, and the yield of manufacturing molded products increases.

Modifications

In the above-described first to third embodiments, the injection cylinder, the injection plunger, and the pressing member can be modified variously.

First Modification

Figure 13A:
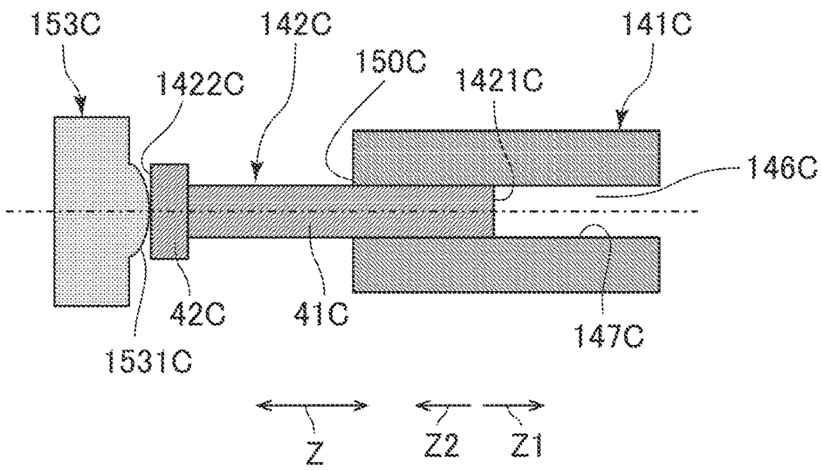
FIG. 13A is a schematic cross-sectional view of an injection cylinder, an injection plunger, and a pressing member of a manufacturing apparatus of a first modification.

FIG. 13A is a schematic cross-sectional view of an injection cylinder 141C, an injection plunger 142C, and a pressing member 153C of a first modification. Preferably, the material of each of the injection cylinder 141C, the injection plunger 142C, and the pressing member 153C is a metal. For example, the material of the injection cylinder 141C is high-speed steel. For example, the material of the injection plunger 142C is powder high-speed steel. For example, the material of the pressing member 153C is high-speed steel. As in the first to the third embodiments, the direction in which the injection plunger 142C moves forward and backward is defined as a Z direction, the direction toward which the injection plunger 142C moves forward is defined as a Z1 direction, and the direction toward which the injection plunger 142C moves backward is defined as a Z2 direction. The Z1 direction is a direction toward which the molten resin is injected, and the Z2 direction is a direction opposite to the Z1 direction.

The injection plunger 142C includes a front-end portion 1421C formed in the Z1 direction, and a back-end portion 1422C formed in the Z1 direction. The front-end portion 1421C of the injection plunger 142C is located in an inner portion 146C of the injection cylinder 141C, and the back-end portion 1422C of the injection plunger 142C is located outside the injection cylinder 141C.

The inner portion 146C of the injection cylinder 141C is a cylindrical space portion defined by an inner circumferential surface 147C of the injection cylinder 141C. The injection plunger 142C includes a cylindrical shaft portion 41C that is inserted in the inner portion 146C, and a flange portion 42C that can abut against an abutment surface 150C of the injection cylinder 141C. Thus, the shaft portion 41C of the injection plunger 142C fits the inner circumferential surface 147C of the injection cylinder 141C.

In the first modification, the front-end portion of the shaft portion 41C is the front-end portion 1421C of the injection plunger 142C, and the back-end portion of the flange portion 42C is the back-end portion 1422C of the injection plunger 142C. Thus, the front-end portion 1421C is included in the shaft portion 41C, and the back-end portion 1422C is included in the flange portion 42C.

The pressing member 153C includes a front-end portion 1531C formed in the Z1 direction. The front-end portion 1531C of the pressing member 153C can be brought into contact with or separated from the back-end portion 1422C of the injection plunger 142C, that is, the back-end portion of the flange portion 42C. Since the flange portion 42C is located outside the injection cylinder 141C, the pressing member 153C, which can be brought into contact with or separated from the flange portion 42C, is kept in a non-contact state where the pressing member 153C is not in contact with the injection cylinder 141C. That is, the pressing member 153C is kept in a state where the pressing member 153C is separated from the injection cylinder 141C.

Preferably, at least one of the back-end portion 1422C of the injection plunger 142C, which faces the pressing member 153C, and the front-end portion 1531C of the pressing member 153C, which faces the injection plunger 142C, is formed spherical. The front-end portion 1531C is one example of a first portion, and the back-end portion 1422C is one example of a second portion.

In the example of FIG. 13A, the front-end portion 1531C is formed spherical, and the back-end portion 1422C is formed flat. Thus, the injection plunger 142C and the pressing member 153C contact each other at a point. Note that the back-end portion 1422C may be spherical and the front-end portion 1531C may be flat. In another case, both of the back-end portion 1422C and the front-end portion 1531C may be spherical.

The inner diameter of the injection cylinder 141C is larger than the diameter of the shaft portion 41C of the injection cylinder 141C. Preferably, the difference between the inner diameter of the injection cylinder 141C and the diameter of the shaft portion 41C of the injection plunger 142C is equal to or larger than 2 μm and equal to or smaller than 50 μm. Since the difference is equal to or larger than 2 μm and equal to or smaller than 50 μm, the leak of the resin from the clearance between the injection cylinder 141C and the shaft portion 41C of the injection plunger 142C can be effectively reduced. In addition, the occurrence in which the injection plunger 142C is caught by the inner circumferential surface 147C of the injection cylinder 141C, that is, the occurrence of gnawing can be effectively reduced.

In the first modification, since the back-end portion 1422C of the injection plunger 142C is exposed to the outside, pulling the injection plunger 142C out of the injection cylinder 141C becomes easy in maintenance such as cleaning. As a result, the maintainability increases.

In addition, since the back-end portion 1422C is included in the flange portion 42C, the injection plunger 142C can be easily pulled out from the injection cylinder 141C by hooking a tool to the flange portion 42C. As a result, the maintainability further increases.

Second Modification

Figure 13B:
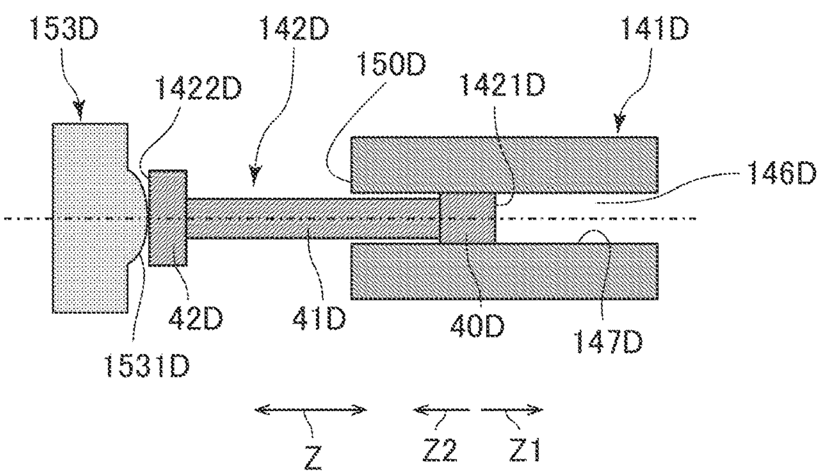
FIG. 13B is a schematic cross-sectional view of an injection cylinder, an injection plunger, and a pressing member of a manufacturing apparatus of a second modification.

FIG. 13B is a schematic cross-sectional view of an injection cylinder 141D, an injection plunger 142D, and a pressing member 153D of a second modification. Preferably, the material of each of the injection cylinder 141D, the injection plunger 142D, and the pressing member 153D is a metal. As in the first to the third embodiments, the direction in which the injection plunger 142D moves forward and backward is defined as a Z direction, the direction toward which the injection plunger 142D moves forward is defined as a Z1 direction, and the direction toward which the injection plunger 142D moves backward is defined as a Z2 direction. The Z1 direction is a direction toward which the molten resin is injected, and the Z2 direction is a direction opposite to the Z1 direction.

The injection plunger 142D includes a front-end portion 1421D formed in the Z1 direction, and a back-end portion 1422D formed in the Z1 direction. The front-end portion 1421D of the injection plunger 142D is located in an inner portion 146D of the injection cylinder 141D, and the back-end portion 1422D of the injection plunger 142D is located outside the injection cylinder 141D.

The inner portion 146D of the injection cylinder 141D is a cylindrical space portion defined by an inner circumferential surface 147D of the injection cylinder 141D. The injection plunger 142D includes a cylindrical shaft portion 41D that is inserted in the inner portion 146D, a cylindrical shaft portion 40D which is inserted in the inner portion 146D and whose diameter is larger than the diameter of the shaft portion 41D, and a flange portion 42D that can abut against an abutment surface 150D of the injection cylinder 141D. The shaft portion 40D is located on the Z1 direction side with respect to the shaft portion 41D. Thus, the shaft portion 40D of the injection plunger 142D fits the inner circumferential surface 147D of the injection cylinder 141D.

In the second modification, the front-end portion of the shaft portion 40D is the front-end portion 1421D of the injection plunger 142D, and the back-end portion of the flange portion 42D is the back-end portion 1422D of the injection plunger 142D. Thus, the front-end portion 1421D is included in the shaft portion 40D, and the back-end portion 1422D is included in the flange portion 42D.

The pressing member 153D includes a front-end portion 1531D formed in the Z1 direction. The front-end portion 1531D of the pressing member 153D can be brought into contact with or separated from the back-end portion 1422D of the injection plunger 142D, that is, the back-end portion of the flange portion 42D. Since the flange portion 42D is located outside the injection cylinder 141D, the pressing member 153D, which can be brought into contact with or separated from the flange portion 42D, is kept in a non-contact state where the pressing member 153D is not in contact with the injection cylinder 141D. That is, the pressing member 153D is kept in a state where the pressing member 153D is separated from the injection cylinder 141D.

Preferably, at least one of the back-end portion 1422D of the injection plunger 142D, which faces the pressing member 153D, and the front-end portion 1531D of the pressing member 153D, which faces the injection plunger 142D, is formed spherical. The front-end portion 1531D is one example of a first portion, and the back-end portion 1422D is one example of a second portion.

In the example of FIG. 13B, the front-end portion 1531D is formed spherical, and the back-end portion 1422D is formed flat. Thus, the injection plunger 142D and the pressing member 153D contact each other at a point. Note that the back-end portion 1422D may be spherical and the front-end portion 1531D may be flat. In another case, both of the back-end portion 1422D and the front-end portion 1531D may be spherical.

The inner diameter of the injection cylinder 141D is larger than the diameter of the shaft portion 40D of the injection plunger 142D. Preferably, the difference between the inner diameter of the injection cylinder 141D and the diameter of the shaft portion 40D of the injection plunger 142D is equal to or larger than 2 μm and equal to or smaller than 50 μm. Since the difference is equal to or larger than 2 μm and equal to or smaller than 50 μm, the leak of the resin from the clearance between the injection cylinder 141D and the shaft portion 40D of the injection plunger 142D can be effectively reduced. In addition, the occurrence in which the injection plunger 142D is caught by the inner circumferential surface 147D of the injection cylinder 141D, that is, the occurrence of gnawing can be effectively reduced.

In the second modification, since the back-end portion 1422D of the injection plunger 142D is exposed to the outside, pulling the injection plunger 142D out of the injection cylinder 141D becomes easy in maintenance such as cleaning. As a result, the maintainability increases.

In addition, since the back-end portion 1422D is included in the flange portion 42D, the injection plunger 142D can be easily pulled out from the injection cylinder 141D by hooking a tool to the flange portion 42D. As a result, the maintainability further increases.

The contact area between the injection plunger 142D and the inner circumferential surface 147D of the second modification is smaller than the contact area between the injection plunger 142C and the inner circumferential surface 147C of the first modification. Thus, the occurrence in which the injection plunger 142D is caught by the inner circumferential surface 147D of the injection cylinder 141D can be more effectively reduced than the occurrence in which the injection plunger 142C is caught by the inner circumferential surface 147C of the injection cylinder 141C in the first modification.

Fourth Embodiment

Figure 13C:
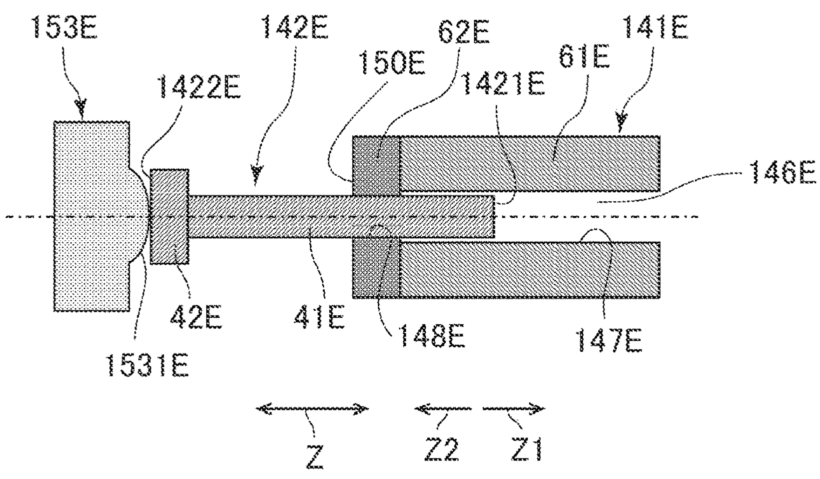
FIG. 13C is a schematic cross-sectional view of an injection cylinder, an injection plunger, and a pressing member of a manufacturing apparatus of a fourth embodiment.

FIG. 13C is a schematic cross-sectional view of an injection cylinder 141E, an injection plunger 142E, and a pressing member 153E of a manufacturing apparatus of a fourth embodiment. Preferably, the material of each of the injection cylinder 141E, the injection plunger 142E, and the pressing member 153E is a metal. As in the first to the third embodiments, the direction in which the injection plunger 142E moves forward and backward is defined as a Z direction, the direction toward which the injection plunger 142E moves forward is defined as a Z1 direction, and the direction toward which the injection plunger 142E moves backward is defined as a Z2 direction. The Z1 direction is a direction toward which the molten resin is injected, and the Z2 direction is a direction opposite to the Z1 direction.

The injection plunger 142E includes a front-end portion 1421E formed in the Z1 direction, and a back-end portion 1422E formed in the Z1 direction. The front-end portion 1421E of the injection plunger 142E is located in an inner portion 146E of the injection cylinder 141E, and the back-end portion 1422E of the injection plunger 142E is located outside the injection cylinder 141E.

The injection cylinder 141E includes a base body 61E and a sleeve 62E. The sleeve 62E is detachably attached to the base body 61E. The injection plunger 142E fits in the sleeve 62E.

The sleeve 62E includes an inner circumferential surface 148E that defines a cylindrical opening portion. The opening portion of the sleeve 62E communicates with an inner portion of the base body 61E. The inner portion of the base body 61E is also formed cylindrical. The diameter of the opening portion of the sleeve 62E is smaller than the diameter of the inner portion of the base body 61E. The opening portion of the sleeve 62E and the inner portion of the base body 61E are included in an inner portion 146E of the injection cylinder 141E. The inner portion 146E of the injection cylinder 141E is a space portion defined by an inner circumferential surface 147E of the injection cylinder 141E.

The injection plunger 142E includes a cylindrical shaft portion 41E that is inserted in the inner portion 146E, and a flange portion 42E that can abut against an abutment surface 150E of the injection cylinder 141E. The abutment surface 150E is included in the sleeve 62E. In the fourth embodiment, the shaft portion 41E of the injection plunger 142E is inserted into the opening portion of the sleeve 62E, and fits the inner circumferential surface 148E of the sleeve 62E. For example, the fit length of a fit portion between the injection plunger 142E and the sleeve 62E in the Z direction is 35 mm.

In the fourth embodiment, the front-end portion of the shaft portion 41E is the front-end portion 1421E of the injection plunger 142E, and the back-end portion of the flange portion 42E is the back-end portion 1422E of the injection plunger 142E. Thus, the front-end portion 1421E is included in the shaft portion 41E, and the back-end portion 1422E is included in the flange portion 42E.

The pressing member 153E includes a front-end portion 1531E formed in the Z1 direction. The front-end portion 1531E of the pressing member 153E can be brought into contact with or separated from the back-end portion 1422E of the injection plunger 142E, that is, the back-end portion of the flange portion 42E. Since the flange portion 42E is located outside the injection cylinder 141E, the pressing member 153E, which can be brought into contact with or separated from the flange portion 42E, is kept in a non-contact state where the pressing member 153E is not in contact with the injection cylinder 141E. That is, the pressing member 153E is kept in a state where the pressing member 153E is separated from the injection cylinder 141E.

Preferably, at least one of the back-end portion 1422E of the injection plunger 142E, which faces the pressing member 153E, and the front-end portion 1531E of the pressing member 153E, which faces the injection plunger 142E, is formed spherical. The front-end portion 1531E is one example of a first portion, and the back-end portion 1422E is one example of a second portion.

In the example of FIG. 13C, the front-end portion 1531E is formed spherical, and the back-end portion 1422E is formed flat. Thus, the injection plunger 142E and the pressing member 153E contact each other at a point. Note that the back-end portion 1422E may be spherical and the front-end portion 1531E may be flat. In another case, both of the back-end portion 1422E and the front-end portion 1531E may be spherical.

The inner diameter of the sleeve 62E of the injection cylinder 141E is larger than the diameter of the shaft portion 41E of the injection plunger 142E. Preferably, the difference between the inner diameter of the sleeve 62E of the injection cylinder 141E and the diameter of the shaft portion 41E of the injection plunger 142E is equal to or larger than 2 μm and equal to or smaller than 50 μm. Since the difference is equal to or larger than 2 μm and equal to or smaller than 50 μm, the leak of the resin from the clearance between the sleeve 62E of the injection cylinder 141E and the shaft portion 41E of the injection plunger 142E can be effectively reduced. In addition, the occurrence in which the injection plunger 142E is caught by the inner circumferential surface 148E of the sleeve 62E of the injection cylinder 141E, that is, the occurrence of gnawing can be effectively reduced.

In the fourth embodiment, since the back-end portion 1422E of the injection plunger 142E is exposed to the outside, pulling the injection plunger 142E out of the injection cylinder 141E becomes easy in maintenance such as cleaning. As a result, the maintainability increases.

In addition, since the back-end portion 1422E is included in the flange portion 42E, the injection plunger 142E can be easily pulled out from the injection cylinder 141E by hooking a tool to the flange portion 42E. As a result, the maintainability further increases.

The injection plunger 142E is not in contact with the base body 61E of the injection cylinder 141E. Thus, the contact area between the injection plunger 142E and the inner circumferential surface 147E is smaller than the contact area between the injection plunger 142C and the inner circumferential surface 147C of the first modification. That is, the injection plunger 142E is in contact with only the inner circumferential surface 148E of the sleeve 62E, of the inner circumferential surface 147E. Thus, in the fourth embodiment, the occurrence in which the injection plunger 142E is caught by the inner circumferential surface 147E of the injection cylinder 141E can be more effectively reduced than the occurrence in which the injection plunger 142C is caught by the inner circumferential surface 147C of the injection cylinder 141C in the first modification.

Furthermore, since the sleeve 62E is detachably attached to the base body 61E, the sleeve 62E has only to be replaced with another sleeve 62E if a fit portion between the injection cylinder 141E and the injection plunger 142E wears in a long-term service. As a result, the maintainability further increases.

The injection plunger 142E includes a portion that slides on the injection cylinder 141E. The resin having adhered to the portion of the injection plunger 142E, which slides on the injection cylinder 141E, may leak to the outside of the injection cylinder 141E, and may be left outside the injection cylinder 141E.

Figure 14:
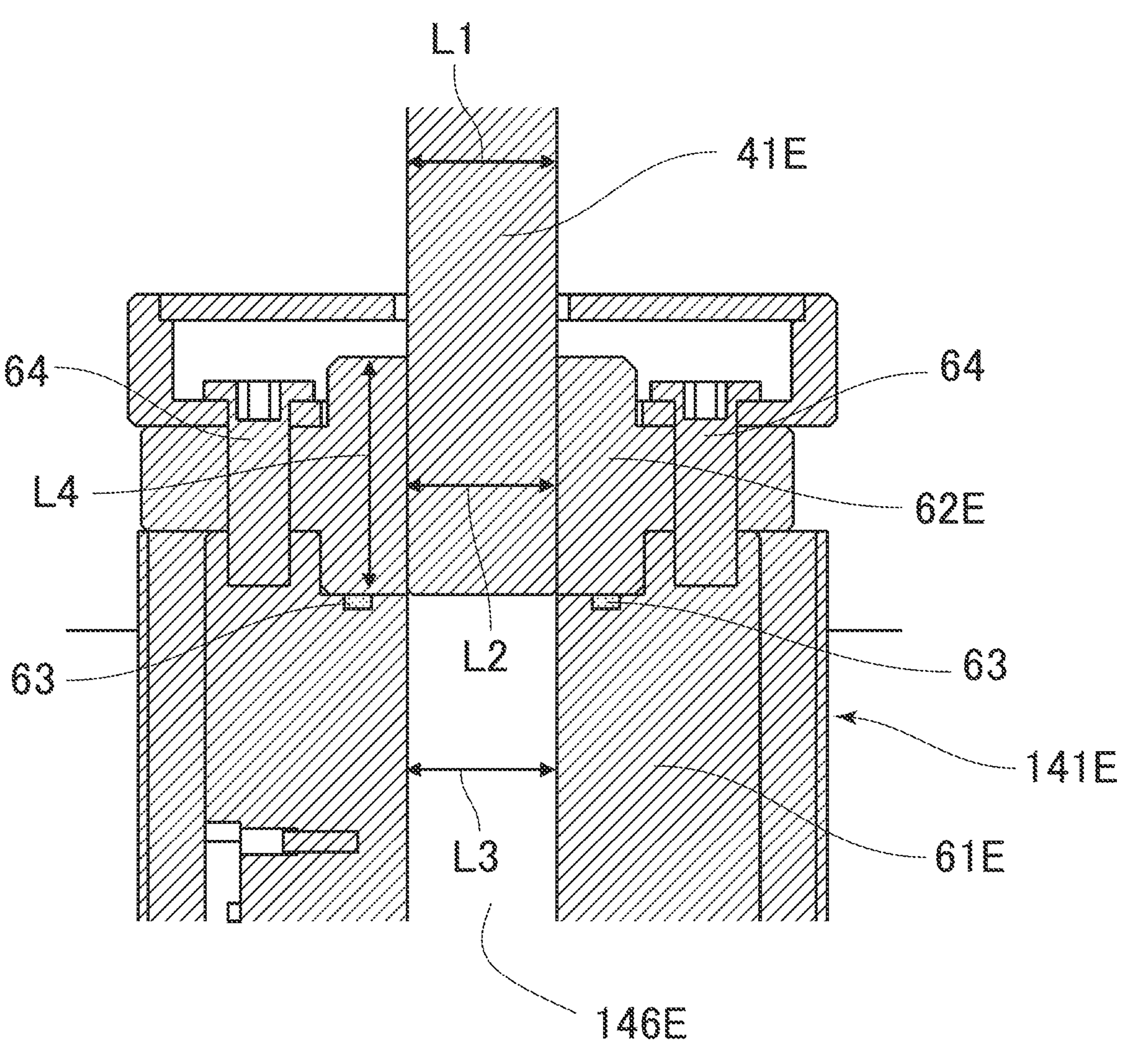
FIG. 14 is a diagram illustrating one portion of the manufacturing apparatus of the fourth embodiment.

FIG. 14 is a diagram illustrating one portion of the manufacturing apparatus of the fourth embodiment. FIG. 14 illustrates a cross section of the one portion of the manufacturing apparatus of the fourth embodiment. In FIG. 14, the gap between the sleeve 62E and the base body 61E is sealed with a sealing member 63, such as an O ring. In FIG. 14, the sleeve 62E is fixed (fastened) to the base body 61E of the injection cylinder 141E with screws 64. Thus, the sleeve 62E is pressed against the base body 61E of the injection cylinder 141E by screws 64. When the injection plunger 142E moves, the injection plunger 142E and the sleeve 62E slide on each other. Preferably, the area of a portion of the injection plunger 142E that slides on the sleeve 62E is larger than the area of a portion of the sleeve 62E that slides on the injection plunger 142E.

The shaft portion 41E of the injection plunger 142E includes a portion that fits in and slides on the injection cylinder 141E. The diameter of the shaft portion 41E of the injection plunger 142E is denoted by L1. The inner diameter of the sleeve 62E is denoted by L2. The inner diameter of the base body 61E is denoted by L3. For example, the fit length of a fit portion between the injection plunger 142E and the sleeve 62E in the Z direction is denoted by L4.

The amount M of leakage of the resin can be expressed by the following equation (1).

$$M \propto \frac{\pi b h^3}{12\eta l}(P_1 - P_2) \tag{1}$$

The equation (1) is an equation that expresses the flow rate of fluid that flows through a gap between two surfaces of concentric cylinders (it is assumed in the equation (1) that the gap is formed between the two surfaces).

In the equation (1), a parameter b denotes a diameter, or the width of the gap. In addition, a parameter 1 denotes the length of the gap, a parameter h denotes the height of the gap, a parameter η denotes the viscosity of the fluid, and a parameter P1–P2 denotes the difference in pressure. It is understood from the equation (1) that as the parameter 1 increases, or the parameter b decreases, the amount M of leakage of the resin can be decreased.

Note that the parameter 1 corresponds to the fit length L4, and that the parameter b corresponds to the diameter L1 of the shaft portion 41E. That is, for making the amount M of leakage of the resin smaller, the fit length L4 is made larger, and/or the diameter L1 of the shaft portion 41E is made smaller.

Thus, it is preferable that the fit length L4 be longer than the diameter L1. As the result of an experiment, it is preferable that the fit length L4 be equal to or larger than 103% of the diameter L1 of the shaft portion 41E. However, if the fit length L4 is too large, the slidability deteriorates. Thus, it is preferable that the fit length L4 be equal to or smaller than 270% of the diameter L1 of the shaft portion 41E. For example, it is preferable that the diameter L1 have a value in a range from 5 to 12.5 mm, and that the fit length L4 have a value in a range from 12.5 to 20 mm.

The diameter L1 of the shaft portion 41E is smaller than the inner diameter L2 of the sleeve 62E. Preferably, the difference between the diameter L1 of the shaft portion 41E and the inner diameter L2 of the sleeve 62E is in a range from 0.001 to 0.010 mm.

The inner diameter L2 of the sleeve 62E may be equal to the inner diameter L3 of the base body 61E of the injection cylinder 141E. However, it is preferable that the inner diameter L2 of the sleeve 62E be smaller than the inner diameter L3 of the base body 61E. As a result of an experiment, it is preferable that the inner diameter L2 of the sleeve 62E be equal to or larger than 99.0% of the inner diameter L3 of the base body 61E and smaller than 100.0% of the inner diameter L3 of the base body 61E. More preferably, the inner diameter L2 of the sleeve 62E is equal to or larger than 99.5% of the inner diameter L3 of the base body 61E and equal to or smaller than 99.8% of the inner diameter L3 of the base body 61E. For example, it is preferable that the inner diameter L2 of the sleeve 62E be smaller than the inner diameter L3 of the base body 61E by a value that is in a range from 0.01 to 0.1 mm.

If the clearance between the base body 61E of the injection cylinder 141E and the injection plunger 142E has a large value, the clearance may cause the resin that stays in the clearance to leak to the outside of the injection cylinder 141E. Thus, in the fourth embodiment, the inner diameter L3 of the base body 61E is made closer to the inner diameter L2 of the sleeve 62E as much as possible. In this manner, the clearance between the base body 61E and the injection plunger 142E is made smaller as much as possible, so that the resin leak is reduced.

Figure 15A:
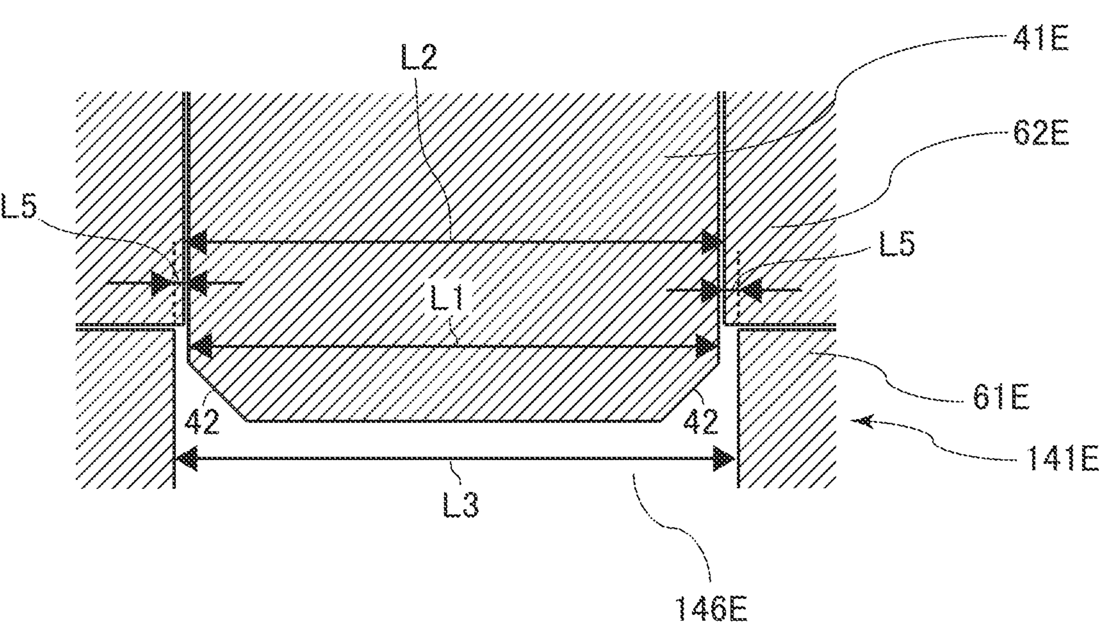
FIG. 15A is a diagram illustrating one portion of the manufacturing apparatus of the fourth embodiment.
Figure 15B:
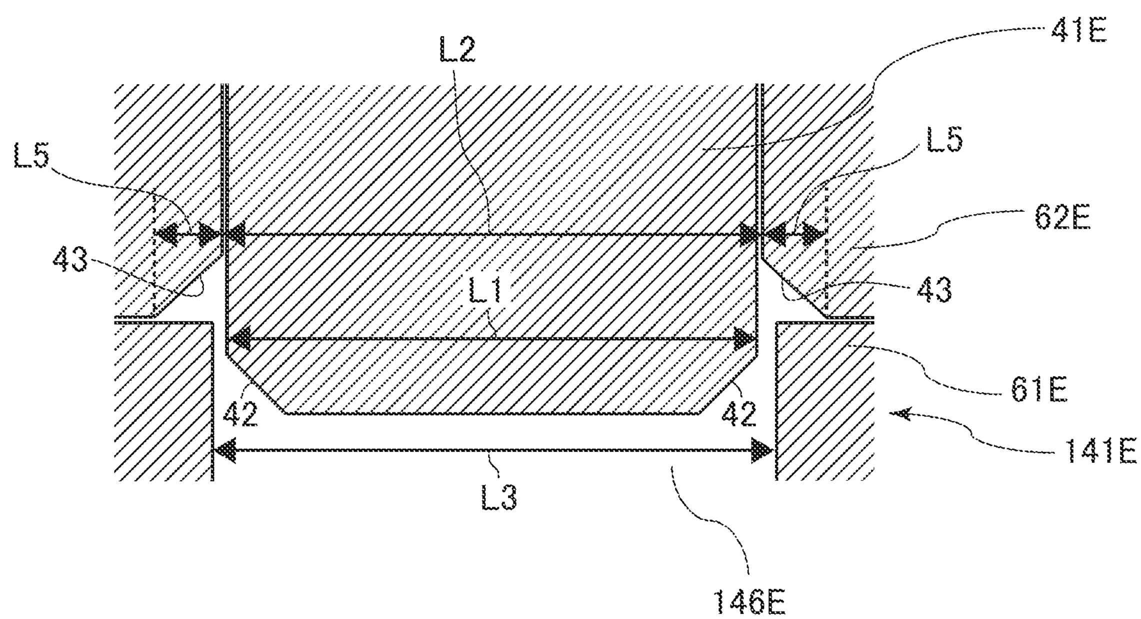
FIG. 15B is a diagram illustrating one portion of the manufacturing apparatus of the fourth embodiment.

FIGS. 15A and 15B are diagrams illustrating one portion of the manufacturing apparatus of the fourth embodiment. FIGS. 15A and 15B illustrate a cross section of the one portion of the manufacturing apparatus of the fourth embodiment. In FIGS. 15A and 15B, a chamfered portion 42 is formed on a front end of the injection plunger 142E The chamfered portion 42 may be a C-chamfered portion. The chamfered portion is formed such that the edge of the front end of the injection plunger 142E, which has still not been chamfered, is chamfered by a distance that is in a range approximately from 0.1 to 1.0 mm, preferably, in a range from 0.2 to 0.6 mm. The width of the chamfered portion 42 is in a range approximately from 0.15 to 1.5 mm.

In FIG. 15B, a chamfered portion 43 is additionally formed inside the sleeve 62E, on the base body 61E side. Since the chamfered portion 43 is formed, a step L5 is formed in a surface constituted by the inner wall of the sleeve 62E and the inner wall of the base body 61E, that is, in a surface that faces the side surface of the shaft portion 41E. The depth of the step L5 corresponds to the depth of the chamfered portion 43.

If the step is formed between the sleeve 62E and the base body 61E, the resin will easily accumulate in the step, and the viscosity of the resin accumulated in the step will increase easily. The resin accumulated in the step and having high viscosity may adhere to the injection plunger, and may cause the resin leak. Thus, it is preferable that the step between the sleeve 62E and the base body 61E be made smaller as much as possible. The step formed between the sleeve 62E and the base body 61E may have a size of approximately (L3−L2)/2. Preferably, the step formed between the sleeve 62E and the base body 61E is smaller than the difference (i.e., L3−L1) between the inner diameter L3 of the base body 61E and the diameter L1 of the injection plunger 142E. More preferably, the step formed between the sleeve 62E and the base body 61E has a size equal to or smaller than a value of (L3−L1)/2. For example, if a chamfered portion is formed on the sleeve 62E and/or the base body 61E (for example, if the chamfered portion 43 of the sleeve 62E is formed), the step L5 formed between the sleeve 62E and the base body 61E may have a size larger than the value of L3−L1. For example, the value of L3−L1 is in a range from 0.01 to 0.1 mm. The step L5 formed by the chamfered portion 43, which is similar to the chamfered portion 42 of the injection plunger 142E, may have a size that is in a range from 0.1 to 1.0 mm. If a chamfered portion having a depth of approximately 0.1 to 1.0 mm is formed on the sleeve 62E or the base body 61E, the step L5 formed between the sleeve 62E and the base body 61E has a size of approximately 0.1 to 1.0 mm. Thus, the size of the step L5 will exceed the value of L3−L1 that is approximately in a range from 0.01 to 0.1 mm. For this reason, it is preferable that a chamfered portion having a size of approximately 0.1 to 1.0 mm not be formed on a portion of the sleeve 62E on the base body 61E side, or on a portion of the base body 61E on the sleeve 62E side. Preferably, the step between the sleeve 62E and the base body 61E is made smaller as much as possible, as illustrated in FIG. 15A, than the step between the sleeve 62E and the base body 61E, illustrated in FIG. 15B. For example, it is preferable that the step L5 be made smaller than a value of L3−L1 (L5≤L3−L1). More preferably, the step L5 is made equal to or smaller than half a value of L3−L1, that is, L5≤(L3−L1)/2.

Preferably, a crystal layer that contains crystals having a crystal grain size of 10 nm to 1 μm is formed on the surface of the injection plunger 142E. The crystal grain size is preferably in a range from 50 to 500 nm, and more preferably, in a range from 100 to 300 nm. In general, the crystal grain size of polycrystalline metal materials is in a range from a few micrometers to a few tens of micrometers. However, since the crystal layer (nanocrystal layer, microcrystal layer) that contains nanocrystals (microcrystals) having a crystal grain size equal to or smaller than 1 μm is formed on (and in the vicinity of) the surface of the injection plunger 142E, the wear resistance, the fatigue strength, and the slidability increase. Such a surface treatment can be performed by using the shot peening. The shot peening is a type of cold working methods that causes innumerable ball-shaped particles, called abrasive or media, to collide with a workpiece at high speed. The ball-shaped particles, which have collided with the workpiece in the shot peening, can cause concave and convex plastic deformation, suppress the growth of a crack caused by compressive residual stress, and achieve the surface reforming by improving the wear resistance by increasing the surface hardness. Note that the crystal layer as described above can be applied to the injection plunger of the other embodiments.

Fifth Embodiment

Figure 16:
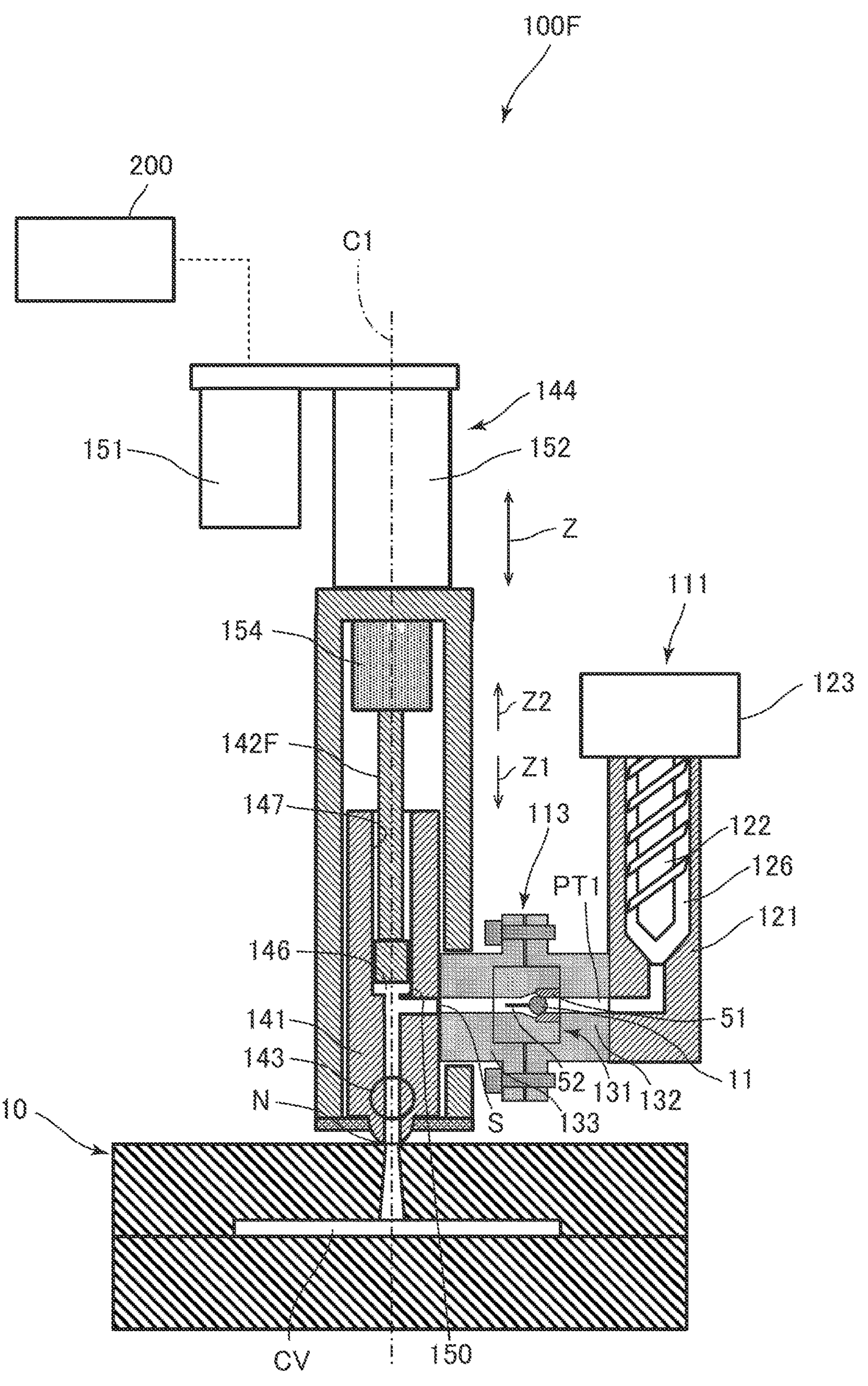
FIG. 16 is a schematic cross-sectional view of a manufacturing apparatus of a fifth embodiment.

Next, a fifth embodiment will be described. In the fifth embodiment, the description of the same features as those of the first embodiment will be simplified or omitted. FIG. 16 is a schematic cross-sectional view of a manufacturing apparatus 100F of the fifth embodiment.

In the above-described manufacturing apparatus 100 of the first embodiment, the injection plunger 142 is separated from the injection driving portion 144. That is, the injection plunger 142 can be brought into contact with or separated from the pressing member 153. In the manufacturing apparatus 100F of the fifth embodiment, the pressing member 153 and the injection plunger 142 of the manufacturing apparatus 100 of the first embodiment are replaced with an injection plunger 142F. That is, the injection plunger 142F is connected to the linear-motion member 154 of the injection driving portion 144. The other configuration of the manufacturing apparatus 100F is the same as that of the manufacturing apparatus 100 of the first embodiment. The injection plunger 142F can be driven by the motor 151 in the Z direction. The control apparatus 200 can control the motor 151. That is, the control apparatus 200 can control (drive) the motor 151 so that the injection plunger 142F moves in the Z direction.

When the control apparatus 200 supplies the molten resin to the injection cylinder 141, the control apparatus 200 stops the motor 151 so that the injection plunger 142F can be moved toward the Z2 direction. If the position and speed control is performed as in the first embodiment, the motor 151 is stopped in the metering process. Since the motor 151 does not produce the driving force after stopped, the injection plunger 142F can be moved toward the Z2 direction by the pressing force of the molten resin. When the control apparatus 200 injects the molten resin from the injection cylinder 141, the control apparatus 200 drives the motor 151 so that the injection plunger 142F can be moved toward the Z1 direction.

In another example, the control apparatus 200 may stop the motor 151 when the supply of the molten resin to the injection cylinder 141 has been completed, so that the injection plunger 142F can be moved toward the Z2 direction. If the pressure control is performed as in the second embodiment, the motor 151 is stopped in the suck-back process. Since the motor 151 does not produce the driving force after stopped, the injection plunger 142F can be moved toward the Z2 direction by the pressing force of the molten resin.

As described above, also in the fifth embodiment, the occurrence of failure in molding, such as void or silver streak, can be reduced in molded products, and the yield of manufacturing molded products increases.

Note that the configuration and control operation in the above-described fifth embodiment can be applied to the above-described third embodiment.

As described above, the present disclosure can provide the technique that is advantageous for reducing the occurrence of failure in molding of molded products.

The present disclosure is not limited to the embodiments described above, and embodiments can be modified in many ways within the technical concept of the present disclosure. In addition, the effects described in the embodiments are merely enumeration of the most preferable effects that can be obtained from embodiments of the present disclosure, and effects of embodiments of the present disclosure are not limited to those described in the embodiments.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-46726, filed Mar. 23, 2022, and Japanese Patent Application No. 2023-24879, filed Feb. 21, 2023, which are hereby incorporated by reference herein in their entirety.

What is claimed is:

1. A manufacturing apparatus comprising:

an injection cylinder to which molten resin is supplied and which is configured to inject molten resin;

an injection plunger disposed such that the injection plunger fits in the injection cylinder and moves in a first direction and a second direction opposite to the first direction;

a pressing member configured to be able to be separated from the injection plunger and press the injection plunger for moving the injection plunger toward the first direction;

a driving source configured to drive the pressing member in the first direction and the second direction;

a control portion configured to control the driving source; and a sensor configured to detect contact and/or separation between the injection plunger and the pressing member, wherein the injection cylinder includes a base body configured to contain molten resin, and a sleeve configured to be detachably attached to the base body, wherein the injection plunger is configured to be inserted into an inner portion of the base body through an opening portion formed in the sleeve and slide on the sleeve, wherein the control portion is configured to control the driving source to move the pressing member to a first position when metering molten resin supplied into the injection cylinder in a state where the pressing member is separated from the injection plunger, wherein, in a state where the pressing member is separated from the injection plunger, molten resin supplied into the injection cylinder presses the injection plunger to move the injection plunger in the second direction, and wherein a contact between the injection plunger and the pressing member that is located at the first position is formed by the moving of the injection plunger in the second direction and is detected by the sensor.

2. The manufacturing apparatus according to claim 1, wherein the control portion is configured to control the driving source for retracting the pressing member to a second position that is retracted from the first position toward the second direction.

3. The manufacturing apparatus according to claim 2, wherein the injection plunger is moved toward the second direction by molten resin supplied into the injection cylinder pressing the injection plunger in a state where the pressing member is in the second position.

4. A method for manufacturing a molded product using the manufacturing apparatus according to claim 3, the method comprising:

injecting molten resin in the injection cylinder into a cavity of a mold by controlling, by the control portion, the driving source so as to move the pressing member from the second position to a third position forward of the first position in the first direction.

5. The manufacturing apparatus according to claim 1, wherein at least a front-end portion of the injection plunger is located in an inner portion of the injection cylinder.

6. The manufacturing apparatus according to claim 1, wherein a whole of the injection plunger is located in an inner portion of the injection cylinder.

7. The manufacturing apparatus according to claim 1, wherein at least one of a first portion of the pressing member that faces the injection plunger or a second portion of the injection plunger that faces the pressing member is formed spherical.

8. The manufacturing apparatus according to claim 1, wherein the injection cylinder includes a supply inlet to which molten resin is supplied, and wherein the manufacturing apparatus further includes a valve configured to prevent molten resin from flowing from the supply inlet toward an outside of the injection cylinder.

9. The manufacturing apparatus according to claim 1, wherein the injection cylinder includes an injection outlet from which molten resin is discharged, and wherein the manufacturing apparatus further includes a valve configured to prevent molten resin from flowing from the injection outlet toward an outside of the injection cylinder.

10. The manufacturing apparatus according to claim 1, wherein the control portion is configured to determine that metering of molten resin is completed, by determining that a movement of the injection plunger is prevented by the pressing member that is located at the first position.

11. A manufacturing method of a molded product, comprising supplying molten resin in the manufacturing apparatus according to claim 1 and molding the molded product.

12. The manufacturing apparatus according to claim 1, wherein a difference between an inner diameter of the sleeve and a diameter of the injection plunger is 2 μm to 50 μm.

13. The manufacturing apparatus according to claim 1, wherein a back-end portion of the injection plunger is located outside the injection cylinder.

14. The manufacturing apparatus according to claim 1, wherein an area of a portion of the injection plunger that slides on the sleeve is larger than an area of a portion of the sleeve that slides on the injection plunger.

15. The manufacturing apparatus according to claim 1, wherein a fit length of a fit portion between the sleeve and the injection plunger is larger than a diameter of the injection plunger.

16. The manufacturing apparatus according to claim 1, wherein a fit length of a fit portion between the sleeve and the injection plunger is 103% to 270% of a diameter of the injection plunger.

17. The manufacturing apparatus according to claim 1, wherein an inner diameter of the sleeve is smaller than an inner diameter of the base body.

18. The manufacturing apparatus according to claim 1, wherein an inner diameter of the sleeve is:

(i) 99.0% to less than 100.0% of an inner diameter of the base body; and/or (ii) smaller than the inner diameter of the base body by 0.01 mm to 0.1 mm.

19. The manufacturing apparatus according to claim 1, wherein a step between the sleeve and the base body is smaller than a difference between a diameter of the injection plunger and an inner diameter of the base body.

20. The manufacturing apparatus according to claim 1, wherein the pressing member is configured to be separated from the injection cylinder.

* * * * *